United States Patent [19]
Dent

[11] Patent Number: 6,011,786
[45] Date of Patent: Jan. 4, 2000

[54] SYSTEMS AND METHODS FOR CONTROL CHANNEL COMMUNICATION IN CELLULAR RADIOTELEPHONE SYSTEMS

[75] Inventor: Paul Wilkinson Dent, Pittsboro, N.C.

[73] Assignee: Ericsson Inc., Research Triangle Park, N.C.

[21] Appl. No.: 08/870,639

[22] Filed: Jun. 6, 1997

[51] Int. Cl.[7] ............................. H04B 7/208; H04B 7/212
[52] U.S. Cl. ...................... 370/330; 370/337; 370/344; 370/347; 370/436; 370/478; 370/480; 370/522; 375/202; 375/299; 375/347
[58] Field of Search .................... 370/318, 321, 370/328, 330, 344, 337, 345, 347, 522, 528, 503, 509, 465, 436, 523, 524, 336, 343, 348, 478, 480, 498, 442; 375/200–203, 299, 347; 455/515, 434

[56] References Cited

U.S. PATENT DOCUMENTS

| | | | |
|---|---|---|---|
| 4,724,435 | 2/1988 | Moses et al. | 340/870.13 |
| 4,940,984 | 7/1990 | Kleiber | 342/173 |
| 4,975,926 | 12/1990 | Knapp | 375/200 |
| 4,984,247 | 1/1991 | Kaufmann et al. | 375/200 |
| 5,046,066 | 9/1991 | Messenger | 370/349 |
| 5,151,920 | 9/1992 | Haagh et al. | 375/200 |
| 5,206,881 | 4/1993 | Messenger et al. | 375/206 |
| 5,231,646 | 7/1993 | Heath et al. | 375/200 |
| 5,276,703 | 1/1994 | Budin et al. | 375/206 |
| 5,285,469 | 2/1994 | Vanderpool | 375/200 |
| 5,487,185 | 1/1996 | Halonen | 455/561 |
| 5,488,631 | 1/1996 | Gold et al. | 375/206 |
| 5,506,863 | 4/1996 | Meidan et al. | 375/202 |
| 5,537,434 | 7/1996 | Persson et al. | 375/202 |
| 5,732,073 | 3/1998 | Kusaki et al. | 370/280 |
| 5,933,418 | 8/1999 | Massingill et al. | 370/321 |

FOREIGN PATENT DOCUMENTS

| | | | |
|---|---|---|---|
| 0 271 347 A2 | 6/1988 | European Pat. Off. | H04B 1/04 |
| 4/18826 | 1/1992 | Japan | H04B 7/26 |
| WO 92/09154 | 5/1992 | WIPO | H04J 13/00 |
| WO 95/26040 | 9/1995 | WIPO . | |
| WO 95/29562 | 11/1995 | WIPO . | |
| WO 96/07284 | 3/1996 | WIPO . | |

OTHER PUBLICATIONS

International Search Report, PCT/US98/11586, Nov. 12, 1998.

*Primary Examiner*—Douglas W. Olms
*Assistant Examiner*—Seema S. Rao
*Attorney, Agent, or Firm*—Myers Bigel Sibley & Sajovec

[57] ABSTRACT

A first control channel associated with a first cell is communicated in the first cell using a first time/frequency window. The first control channel and a traffic channel are communicated in a second cell using the first time/frequency window. The first control channel may be communicated in the second cell when the first time/frequency window is unassigned to a traffic channel in the second cell. The first time/frequency window may be assigned to a traffic channel in the second cell, and the first control channel may be communicated in the second cell when the traffic channel to which the first time/frequency window is assigned in the second cell is idle. The traffic channel to which the first time/frequency window is assigned in the second cell may be communicated over different carrier frequency bands to thereby frequency hop the traffic channel. The second cell may be served by a base station, and a traffic channel may be communicated between the base station and a radiotelephone using the first time/frequency window at a signal power level which decreases as the distance between the base station and the radiotelephone decreases.

104 Claims, 12 Drawing Sheets

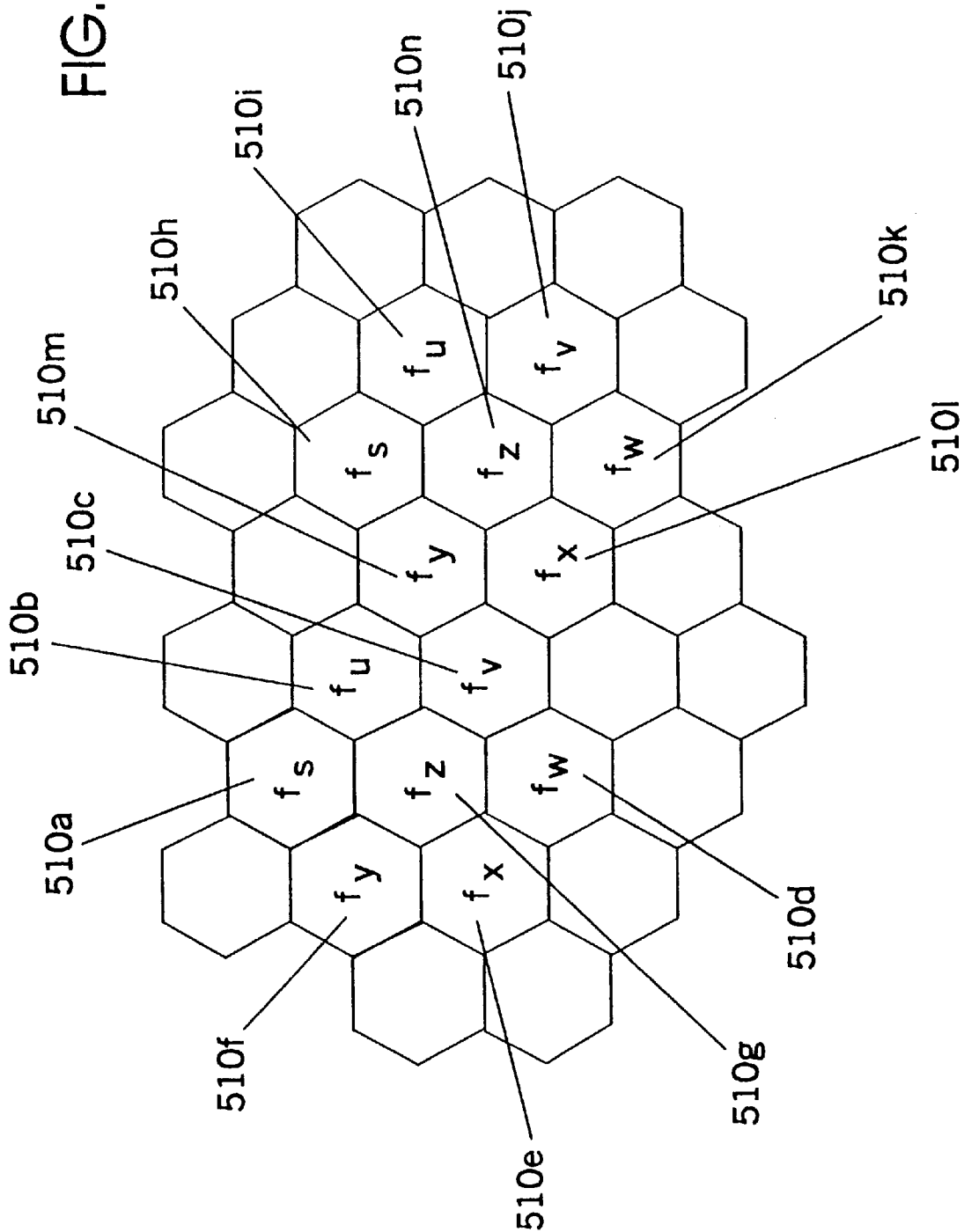

FIG. 8A

| Cell (or Sector) | Frequency Band | Time Slot | | | | | | | |
|---|---|---|---|---|---|---|---|---|---|
| | | $t_1$ | $t_2$ | $t_3$ | $t_4$ | $t_5$ | $t_6$ | $t_7$ | $t_8$ |
| i | $f_u$ | $C_i$ | Traffic or $C_j$ | Traffic or $C_k$ | Traffic | Traffic | Traffic | Traffic | Traffic |
| | $f_v$ | Traffic | Traffic | Traffic | Traffic | Traffic | Traffic | Traffic | Traffic |
| | $f_x$ | Traffic | Traffic | Traffic | Traffic | Traffic | Traffic | Traffic | Traffic |
| | $f_y$ | Traffic | Traffic | Traffic | Traffic | Traffic | Traffic | Traffic | Traffic |
| j | $f_u$ | Traffic or $C_i$ | $C_j$ | Traffic or $C_k$ | Traffic | Traffic | Traffic | Traffic | Traffic |
| | $f_v$ | Traffic | Traffic | Traffic | Traffic | Traffic | Traffic | Traffic | Traffic |
| | $f_x$ | Traffic | Traffic | Traffic | Traffic | Traffic | Traffic | Traffic | Traffic |
| | $f_y$ | Traffic | Traffic | Traffic | Traffic | Traffic | Traffic | Traffic | Traffic |
| k | $f_u$ | Traffic or $C_i$ | Traffic or $C_j$ | $C_k$ | Traffic | Traffic | Traffic | Traffic | Traffic |
| | $f_v$ | Traffic | Traffic | Traffic | Traffic | Traffic | Traffic | Traffic | Traffic |
| | $f_x$ | Traffic | Traffic | Traffic | Traffic | Traffic | Traffic | Traffic | Traffic |
| | $f_y$ | Traffic | Traffic | Traffic | Traffic | Traffic | Traffic | Traffic | Traffic |

FIG. 8B

| Cell (or Sector) | Frequency Band | Time Slot | | | | | | | |
|---|---|---|---|---|---|---|---|---|---|
| | | $t_1$ | $t_2$ | $t_3$ | $t_4$ | $t_5$ | $t_6$ | $t_7$ | $t_8$ |
| i | $f_u$ | $C_i$ | Traffic | Traffic | Traffic | Traffic | Traffic | Traffic | Traffic |
| | $f_v$ | Traffic or $C_j$ | Traffic | Traffic | Traffic | Traffic | Traffic | Traffic | Traffic |
| | $f_x$ | Traffic or $C_k$ | Traffic | Traffic | Traffic | Traffic | Traffic | Traffic | Traffic |
| | $f_y$ | Traffic | Traffic | Traffic | Traffic | Traffic | Traffic | Traffic | Traffic |
| j | $f_u$ | Traffic or $C_i$ | Traffic | Traffic | Traffic | Traffic | Traffic | Traffic | Traffic |
| | $f_v$ | $C_j$ | Traffic | Traffic | Traffic | Traffic | Traffic | Traffic | Traffic |
| | $f_x$ | Traffic or $C_k$ | Traffic | Traffic | Traffic | Traffic | Traffic | Traffic | Traffic |
| | $f_y$ | Traffic | Traffic | Traffic | Traffic | Traffic | Traffic | Traffic | Traffic |
| k | $f_u$ | Traffic or $C_i$ | Traffic | Traffic | Traffic | Traffic | Traffic | Traffic | Traffic |
| | $f_v$ | Traffic or $C_j$ | Traffic | Traffic | Traffic | Traffic | Traffic | Traffic | Traffic |
| | $f_x$ | $C_k$ | Traffic | Traffic | Traffic | Traffic | Traffic | Traffic | Traffic |
| | $f_y$ | Traffic | Traffic | Traffic | Traffic | Traffic | Traffic | Traffic | Traffic |

FIG. 8C

| Cell (or Sector) | Frequency Band | Time Slot | | | | | | | |
|---|---|---|---|---|---|---|---|---|---|
| | | $t_1$ | $t_2$ | $t_3$ | $t_4$ | $t_5$ | $t_6$ | $t_7$ | $t_8$ |
| i | $f_u$ | $C_i$ | Traffic | Traffic | Traffic | Traffic | Traffic | Traffic | Traffic |
| | $f_v$ | Traffic | Traffic or $C_j$ | Traffic | Traffic | Traffic | Traffic | Traffic | Traffic |
| | $f_x$ | Traffic | Traffic | Traffic or $C_k$ | Traffic | Traffic | Traffic | Traffic | Traffic |
| | $f_y$ | Traffic | Traffic | Traffic | Traffic | Traffic | Traffic | Traffic | Traffic |
| j | $f_u$ | Traffic or $C_i$ | Traffic | Traffic | Traffic | Traffic | Traffic | Traffic | Traffic |
| | $f_v$ | Traffic | $C_j$ | Traffic | Traffic | Traffic | Traffic | Traffic | Traffic |
| | $f_x$ | Traffic | Traffic | Traffic or $C_k$ | Traffic | Traffic | Traffic | Traffic | Traffic |
| | $f_y$ | Traffic | Traffic | Traffic | Traffic | Traffic | Traffic | Traffic | Traffic |
| k | $f_u$ | Traffic or $C_i$ | Traffic | Traffic | Traffic | Traffic | Traffic | Traffic | Traffic |
| | $f_v$ | Traffic | Traffic or $C_j$ | Traffic | Traffic | Traffic | Traffic | Traffic | Traffic |
| | $f_x$ | Traffic | Traffic | $C_k$ | Traffic | Traffic | Traffic | Traffic | Traffic |
| | $f_y$ | Traffic | Traffic | Traffic | Traffic | Traffic | Traffic | Traffic | Traffic |

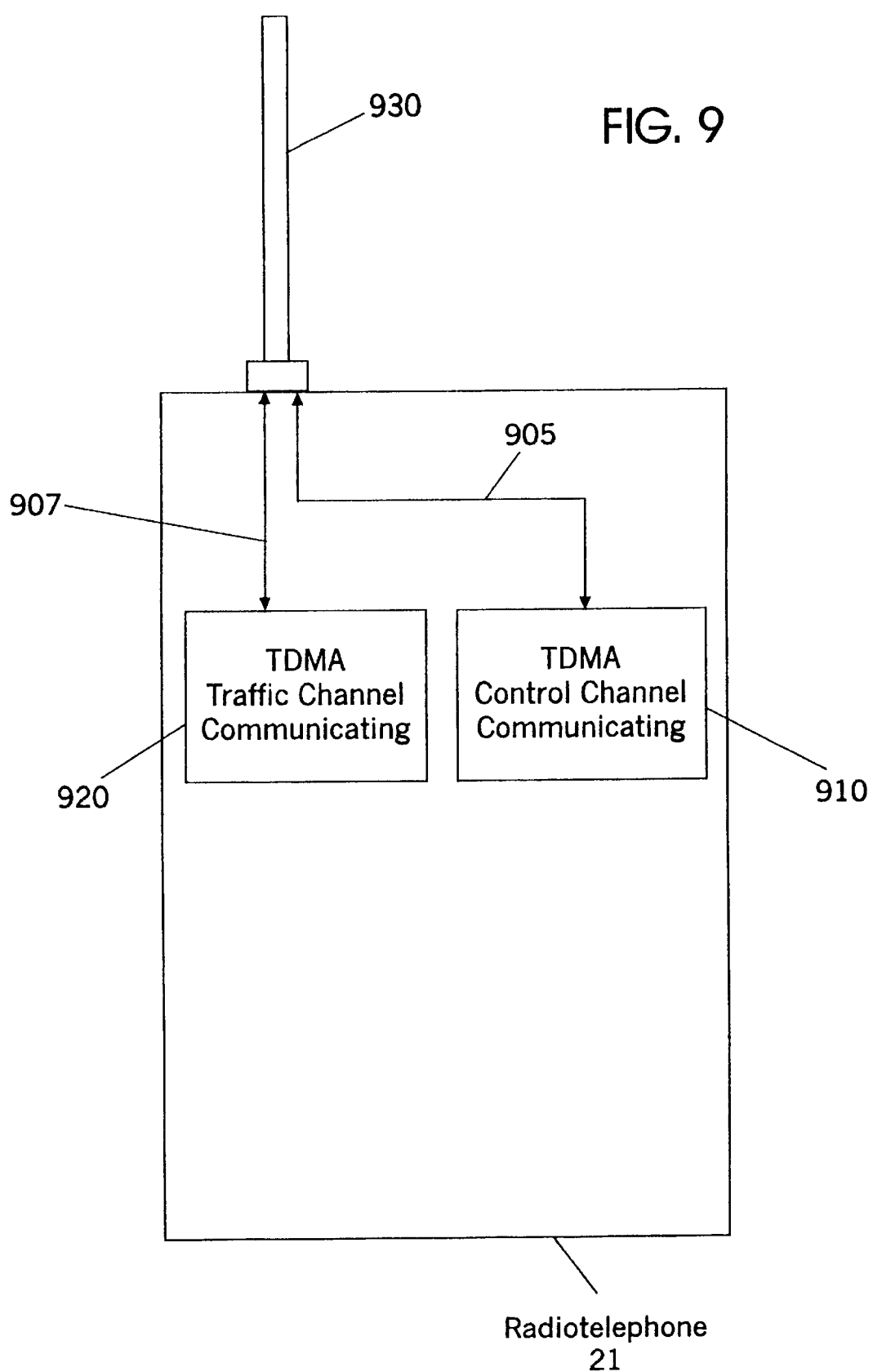

SYSTEMS AND METHODS FOR CONTROL CHANNEL COMMUNICATION IN CELLULAR RADIOTELEPHONE SYSTEMS

FIELD OF THE INVENTION

The present invention relates to radiotelephone communications systems and methods, in particular, to cellular radiotelephone communications systems and methods.

BACKGROUND OF THE INVENTION

Cellular radiotelephone systems are commonly employed to provide voice and data communications to a plurality of subscribers. For example, analog cellular radiotelephone systems, such as designated AMPS, ETACS, NMT-450, and NMT-900, have been deployed successfully throughout the world. More recently, digital cellular radiotelephone systems such as designated IS-54B in North America and the pan-European GSM system have been introduced. These systems, and others, are described, for example, in the book titled *Cellular Radio Systems* by Balston, et al., published by Artech House, Norwood, Ma., 1993.

FIG. 1 illustrates a typical terrestrial cellular radiotelephone communication system 20 as in the prior art. The cellular radiotelephone system may include one or more radiotelephones 21, communicating with a plurality of cells 36 served by base stations 23 and a mobile telephone switching office (MTSO) 25. Although only three cells 36 are shown in FIG. 1, a typical cellular network may include hundreds of cells, may include more than one MTSO, and may serve thousands of radiotelephones.

The cells 36 generally serve as nodes in the communication system 20, from which links are established between radiotelephones 21 and the MTSO 25, by way of the base stations 23 serving the cells 36. Each cell will have allocated to it one or more dedicated control channels and one or more traffic channels. The control channel is a dedicated channel used for transmitting cell identification and paging information. The traffic channels carry the voice and data information. Through the cellular network 20, a duplex radio communication link 32 may be effected between two mobile stations 21 or between a radiotelephone 21 and a landline telephone user 33. The function of the base station 23 is commonly to handle the radio communication between the cell and the mobile station 21. In this capacity, the base station 23 functions chiefly as a relay station for data and voice signals.

Referring now to the prior art schematic plan view illustration of FIG. 2A, in rural areas base stations 23 are commonly located at the center of a cell 36, thereby providing omnidirectional coverage. In an omnidirectional cell, the control channel(s) and the active traffic channel(s) are broadcast in all areas of the cell—usually from a single antenna. Where base stations 23 are more densely located, a sectorized antenna system may be employed as in the prior art, and shown by the schematic diagram of FIG. 2B. Sectorization employs directional antennas 70 having, for example, a 120 degree radiation pattern, each illuminating a sector cell 36 as illustrated in FIG. 2B.

As illustrated in FIG. 3, satellites 110 may be employed to perform similar functions to those performed by base stations in a conventional terrestrial radiotelephone system, for example, in areas where population is sparsely distributed over large areas or where rugged topography tends to make conventional landline telephone or terrestrial cellular telephone infrastructure technically or economically impractical. A satellite radiotelephone system 100 typically includes one or more satellites 110 which serve as relays or transponders between one or more earth stations 130 and radiotelephones 21. The satellite conveys radiotelephone communications over duplex links 170, 180 to radiotelephones 21 and the earth station 130. The earth station may in turn be connected to a public switched telephone network 30, allowing communications between satellite radiotelephones, and communications between satellite radio telephones and conventional terrestrial cellular radiotelephones or landline telephones. The satellite radiotelephone system may utilize a single antenna beam covering the entire area served by the system, or, as shown, the satellite may be designed such that it produces multiple minimally-overlapping beams 150, each serving distinct geographical coverage areas 160 in the system's service region. The coverage areas 160 serve a similar function to the cells 36 of a terrestrial cellular system.

Traditional analog radiotelephone systems generally employ a system referred to as frequency division multiple access (FDMA) to create communications channels. As a practical matter well-known to those skilled in the art, radiotelephone communications signals, being modulated waveforms, typically are communicated over predetermined frequency bands in a spectrum of carrier frequencies. Each of these discrete frequency bands serve as a channel over which cellular radiotelephones communicate with a cell, through the base station or satellite serving the cell. In the United States, for example, Federal authorities have allocated to cellular communications a block of the UHF frequency spectrum further subdivided into pairs of narrow frequency bands, a system designated EIA-553 or IS-19B. Channel pairing results from the frequency duplex arrangement wherein the transmit and receive frequencies in each pair are offset by 45 Mhz. At present there are 832, 30-Khz wide, radio channels allocated to cellular mobile communications in the United States.

The limitations on the number of available frequency bands presents several challenges as the number of subscribers increases. Increasing the number of subscribers in a cellular radiotelephone system requires more efficient utilization of the limited available frequency spectrum in order to provide more total channels while maintaining communications quality. This challenge is heightened because subscribers may not be uniformly distributed among cells in the system. More channels may be needed for particular cells to handle potentially higher local subscriber densities at any given time. For example, a cell in an urban area might conceivably contain hundreds or thousands of subscribers at any one time, easily exhausting the number of channels available in the cell.

For these reasons, conventional cellular systems employ frequency reuse to increase potential channel capacity in each cell and increase spectral efficiency. Frequency reuse involves allocating frequency bands to each cell, with cells employing the same frequencies geographically separated to allow radiotelephones in different cells to simultaneously use the same frequency without interfering with each other. By so doing, many thousands of subscribers may be served by a system of only several hundred frequency bands.

Another technique which may further increase channel capacity and spectral efficiency is time division multiple access (TDMA). A TDMA system may be implemented by subdividing the frequency bands employed in conventional FDMA systems into sequential time slots, as illustrated in FIG. 4. Although communication on frequency bands $f_1$–$f_m$ typically occur on a repetitive TDMA frame structure 410 that includes a plurality of time slots $t_1$–$t_n$, as shown, communications on each frequency band may occur according to a unique TDMA frame, with time slots unique to that band. Examples of systems employing TDMA are the dual analog/digital IS-54B standard employed in the United States, in which each of the original frequency bands of EIA-553 is subdivided into 3 time slots, and the European GSM standard, which divides each of its frequency bands into 8 time slots. In these TDMA systems, each user communicates with the base station using bursts of digital data transmitted during the user's assigned time slots.

A traffic channel in a TDMA system typically includes at least one time slot on at least one frequency band. As discussed above, traffic channels are used to communicate voice, data or other information between users, for example, between a radiotelephone and a landline telephone. In this manner, each traffic channel forms one direction of the duplex communications link established by the system from one user to another. Traffic channels typically are dynamically assigned by the system when and where needed. In addition, systems such as the European GSM system, "frequency hop" traffic channels, i.e., permute the frequency band on which a particular traffic channel is transmitted on a frame-by-frame basis, typically using the same time slot. Frequency hopping can reduce the probability of interference events between channels, by reducing the likelihood that the same two stations will use the same frequency at the same time. This can help provide for communications quality related to average instead of worst case interference.

Included in the dedicated control channels transmitted in a cell are forward control channels which are used to broadcast control information in a cell of the radiotelephone system to radiotelephones which may seek to access the system. The control information broadcast on a forward control channel may include such things as the cell's identification, an associated network identification, system timing information and other information needed to access the radiotelephone system from a radiotelephone.

Conventionally, control channels, such as the Broadcast Control Channel (BCCH) of GSM, are transmitted on a fixed, i.e., non-hopped, frequency band in each cell. A radiotelephone seeking access to a system generally "listens" to a control channel in standby mode, unsynchronized to a base station or satellite until it captures a base station or satellite control channel. In order to prevent undue interference between control channels in neighboring cells, frequency reuse is conventionally employed, with different dedicated frequency bands being used for the control channel in neighboring cells, according to a frequency reuse pattern that guarantees a minimum separation between cochannel cells. Frequency hopping, which might allow denser reuse of control channel frequency bands, is typically not employed for control channels because an unsynchronized radiotelephone, for example, a radiotelephone which has just been powered up, generally would have difficulty capturing a frequency-hopped control channel due to lack of a time reference point for the frequency hopping sequence employed.

SUMMARY OF THE INVENTION

In light of the foregoing, it is an object of the present invention to provide radiotelephone communications systems and methods which can provide more efficient spectral utilization than conventional systems.

It is another object of the present invention to provide radiotelephone communications systems and methods which can provide improved communication of control channels.

These and other objects, features and advantages are provided according to the present invention by cellular radiotelephone systems which communicate a control channel in a first cell using a time/frequency window, i.e., a combination of a carrier frequency band and time slot, and use the same time/frequency window to communicate the same control channel in a second, preferably adjacent cell, when this time/frequency window is not being used to communicate traffic, e.g., when the time/frequency window is unassigned to a traffic channel or when a traffic channel assigned to the time/frequency window is idle due to discontinuous transmission (DTX). The time/frequency windows of the radiotelephone communications system may be assigned according to a reuse plan which minimizes cochannel interference between neighboring cells by providing a separation between cells using the same time/frequency window that produces a probability or level of interference which is less than a predetermined threshold. The simultaneously communicated control channel may be diversity combined at a receiving radiotelephone to improve communication of the control channel.

The present invention stems from the realization that although there are timing difficulties associated with attempting to communicate control channels using frequency hopping as conventionally employed for traffic channels, control channels may be transmitted in neighboring cells using different time/frequency windows to more efficiently use the carrier frequency spectrum available to the system while still providing channels which can be detected by an unsynchronized radiotelephone, e.g., a radiotelephone which has just been powered up. Efficiency may be increased by using time/frequency windows which are not used to communicate a control channel in a particular cell to communicate frequency-hopped traffic channels in that cell without incurring an undue probability of interference with control channels in neighboring cells. Efficiency in the use of spectral resources may also be improved by employing geographical reuse of the time/frequency windows. As traffic channels may be discontinuously transmitted, interference diversity may be provided by frequency hopping traffic channels, and lower power levels may be used to communicate traffic channel information, additional spectral utilization efficiency can be provided without an undue increase in interference. By simultaneously broadcasting a control channel for one cell using the same time/frequency window in neighboring cells when the time/frequency window is unassigned or otherwise idle, control channel reception may be improved due to spatial diversity achieved by transmitting the control channel signal from diverse locations and combining the diverse signals at a receiving radiotelephone.

In particular, according to the present invention, a cellular radiotelephone communications system includes a plurality of cells for communicating with radiotelephones, and time division multiple access (TDMA) communicating means for communicating radiotelephone communications channels in a plurality of cells over a plurality of carrier frequency bands during a plurality of sequential time slots such that the plurality of carrier frequency bands and the plurality of time slots define a plurality of time/frequency windows. The TDMA communicating means includes first cell TDMA communicating means for communicating radiotelephone communications channels in a first cell, the first cell TDMA communicating means communicating a first control channel associated with the first cell using a first time/frequency window. The TDMA communicating means also includes second cell TDMA communicating means for communicating radiotelephone communications channels in a second cell, preferably an adjacent or neighboring cell, the second cell TDMA communicating means communicating the first control channel and a traffic channel using the first time/frequency window.

The second cell TDMA communicating means may communicate the first control channel in the second cell using the first time/frequency window when the first time/frequency window is unassigned to a traffic channel in the second cell, and/or may communicate the first control channel in the second cell using the first time/frequency window when a traffic channel to which the first time/frequency window is assigned is idle, thus providing for potential improved capture of the first control channel through diversity reception. The second cell TDMA communicating means may also communicate a traffic channel to which the first time/frequency window is assigned over different carrier frequency bands to thereby frequency hop the traffic channel, which can potentially reduce interference between the traffic channel and the first control channel. The second cell TDMA communicating means may also include a base station which communicates a traffic channel to a radiotelephone using the first time/frequency window at a signal power level which decreases as the distance between the base station and the radiotelephone decreases, to further reduce interference.

In one embodiment according to the present invention, the first cell TDMA communicating means communicates the first control channel in the first cell over one of the carrier frequency bands during a first time slot, and the second cell TDMA communicating means communicates the second control channel in the second cell over the one carrier frequency band during a second time slot. In another embodiment, the first cell TDMA communicating means communicates the first control channel over a first carrier frequency band during one of the plurality of time slots, and the second cell TDMA communicating means communicates the second control channel over a second carrier frequency band during the one time slot.

A radiotelephone for communicating in a time division multiple access (TDMA) cellular radiotelephone communications system according to the present invention includes TDMA control channel communicating means for communicating a first control channel associated with a first cell using a first time/frequency window and for communicating a second control channel associated with a second cell using a second time/frequency window. TDMA traffic channel communicating means communicates a traffic channel using the second time/frequency window. The TDMA control channel communicating means may communicate the second control channel when the second time/frequency window is unassigned to a traffic channel. The TDMA control channel communicating means may communicate the second control channel when a traffic channel to which the second time/frequency window is assigned is idle. The TDMA traffic channel communicating means communicates a traffic channel to which the second time/frequency window is assigned over different frequency bands to thereby frequency hop the traffic channel.

A base station for communicating with radiotelephones in a time division multiple access (TDMA) cellular radiotelephone communications system according to the present invention includes means for communicating a first control channel associated with a first cell using a first time/frequency window, and means for communicating a traffic channel and a second control channel associated with a second cell using a second time/frequency window. The means for communicating a traffic channel and a second control channel may communicate the second control channel when the second time/frequency window is unassigned to a traffic channel. The means for communicating a traffic channel and a second control channel may also communicate the second control channel when a traffic channel to which the second time/frequency window is assigned is idle. In addition, the means for communicating a traffic channel and a second control channel may communicate a traffic channel to which the second time/frequency window is assigned over different carrier frequency bands to thereby frequency hop the traffic channel. The means for communicating a traffic channel and a second control channel may communicate a traffic channel to a radiotelephone at a signal power level which decreases as the distance between the base station and the radiotelephone decreases.

According to method aspects, a first control channel associated with a first cell is communicated in the first cell using a first time/frequency window. The first control channel and a traffic channel are communicated in a second cell using the first time/frequency window. The first control channel may be communicated in the second cell when the first time/frequency window is unassigned to a traffic channel in the second cell. The first time/frequency window may be assigned to a traffic channel in the second cell, and the first control channel may be communicated in the second cell when the traffic channel to which the first time/frequency window is assigned in the second cell is idle. The traffic channel to which the first time/frequency window is assigned in the second cell may be communicated over different carrier frequency bands to thereby frequency hop the traffic channel. The second cell may be served by a base station, and a traffic channel may be communicated between the base station and a radiotelephone using the first time/frequency window at a signal power level which decreases as the distance between the base station and the radiotelephone decreases.

According to one method aspect, the first control channel may be communicated in the first cell over one of the carrier frequency bands during a first time slot, and a second control channel may be communicated in the second cell over the one carrier frequency band during a second time slot. According to another method aspect, the first control channel may be communicated in the first cell over a first carrier frequency band during one of the plurality of time slots, and a second control channel may be communicated in the second cell over a second carrier frequency band during the one time slot.

BRIEF DESCRIPTION OF THE DRAWINGS

Some of the objects and advantages of the present invention having been stated, others will be more fully understood from the detailed description that follows and by reference to the accompanying drawings in which:

FIGS. 6A–B illustrate time/frequency window reuse for communicating control channels in a plurality of omnidirectional cells according to the present invention;

FIGS. 8A–C illustrate embodiments of time/frequency window reuse according to the present invention; and FIG. 9 illustrates a radiotelephone for communicating with a TDMA cellular radiotelephone communications system according to the present invention.

DETAILED DESCRIPTION

Figure 1:
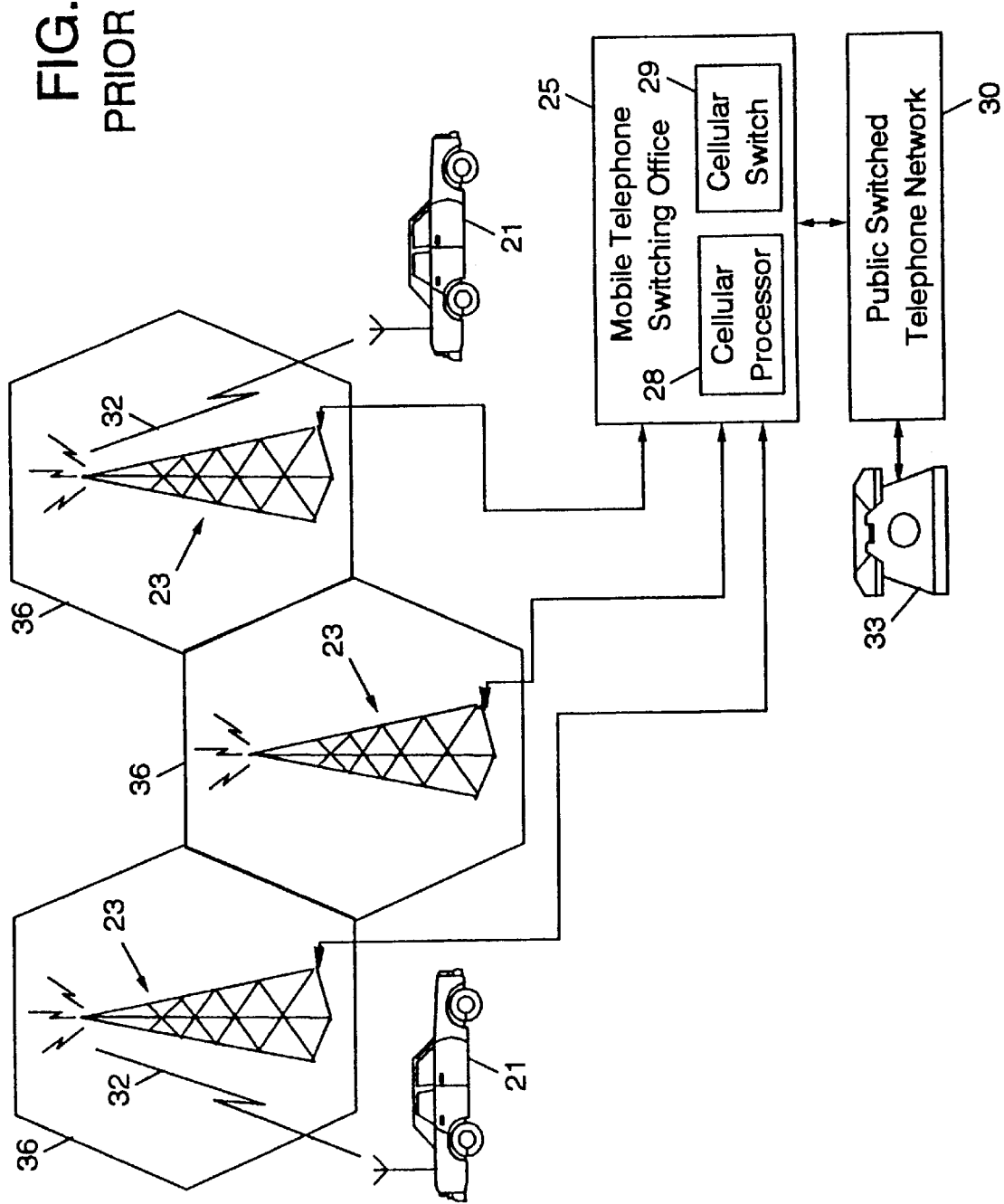
FIG. 1 illustrates a terrestrial cellular radiotelephone communications system as in the prior art.
Figure 2A:
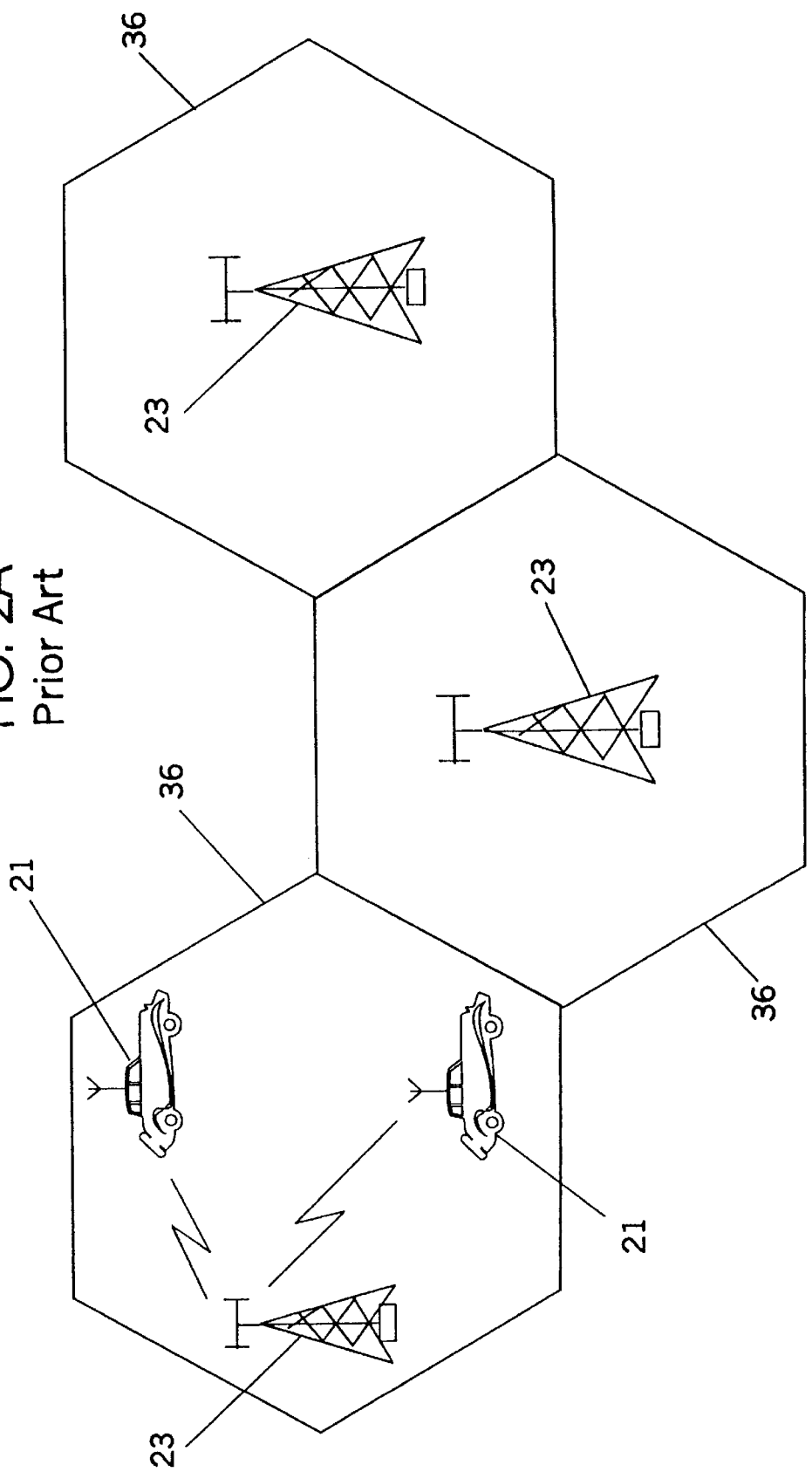
FIGS. 2A–2B illustrate cells in a cellular radiotelephone communications system as in the prior art.
Figure 2B:
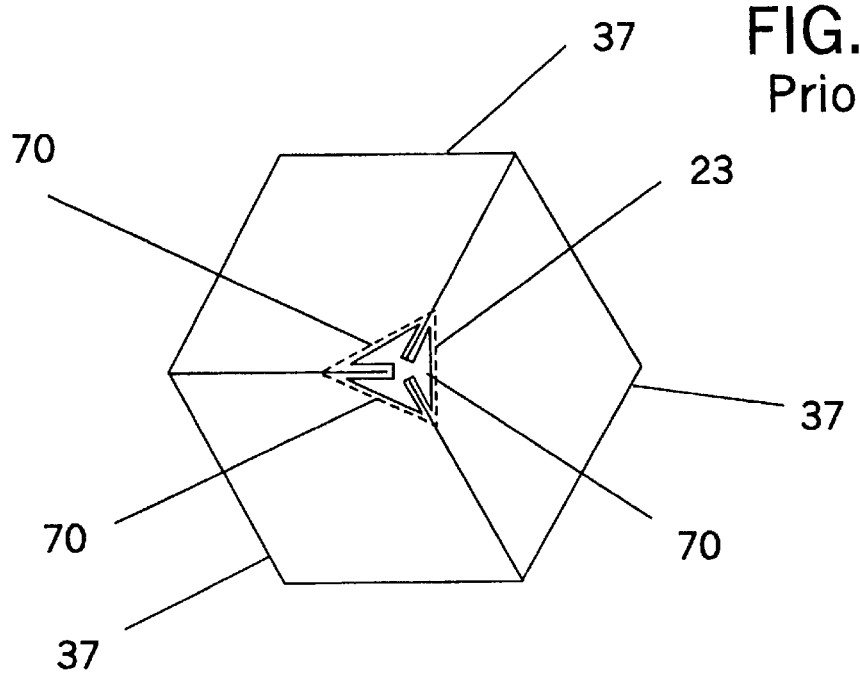

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present application relates to communication over channels in time division multiple access (TDMA) communications systems in which radiotelephone communications occur using a plurality of carrier frequency bands during a plurality of sequential time slots. As those skilled in the art will appreciate, terms such as "channel" are not always consistently used in the literature; for example, the IEEE Standard Dictionary of Electrical Terms defines a "channel" as both a communications path and a band of frequencies. In a conventional FDMA system, for example, a "channel" may refer or correspond to a band of frequencies occupied by a modulated carrier. In a TDMA system such as GSM, "channel" often is used to refer to a group of time slots on one or more frequency bands, for example, the periodic time slots on particular frequency bands which are allocated to the so-called "common channels" such as the Broadcast Control Channel (BCCH). In still other contexts, for example, in some packet systems, a "channel" may be defined by an addressing scheme which may have no particular correlation to the frequency or time of transmission. For purposes of the present application herein, however, "channel" refers to a communications path allocated from a communications interface, whether it be a frequency band, a time slice thereof, or the like.

"Frequency band" as used herein refers to a frequency range over which a communications signal, e.g., a modulated carrier signal, is distributed. This band may be, but need not necessarily be, centered about a central carrier frequency. Those skilled in the art will appreciate that the carrier frequency bands described herein need not be non-overlapping or contiguous; for example, modulated carriers typically may overlap in their spectral distributions without producing unacceptable levels of interference. In fact, in some systems the overlap may be sizable.

In TDMA systems, communications typically occur on carrier frequency bands during a sequential plurality of time slots; in GSM, for example, the carrier frequency bands are centered every 200 KHz, and the time slots have a duration of 0.577 ms. Those skilled in the art will appreciate that the plurality of carrier frequency bands and the plurality of time slots can be viewed as defining a plurality of time/frequency "windows." Each time/frequency window corresponds to a particular time slot on a particular frequency band, serving as a unit of channel capacity which can be used for communication of information. The concept of a time/frequency window in a GSM system, sometimes referred to as a "slot," is described in detail in Mouly and Pautet, *The GSM System for Mobile Communications*, pp. 195–197 (published by the authors, 1992).

Figure 5:
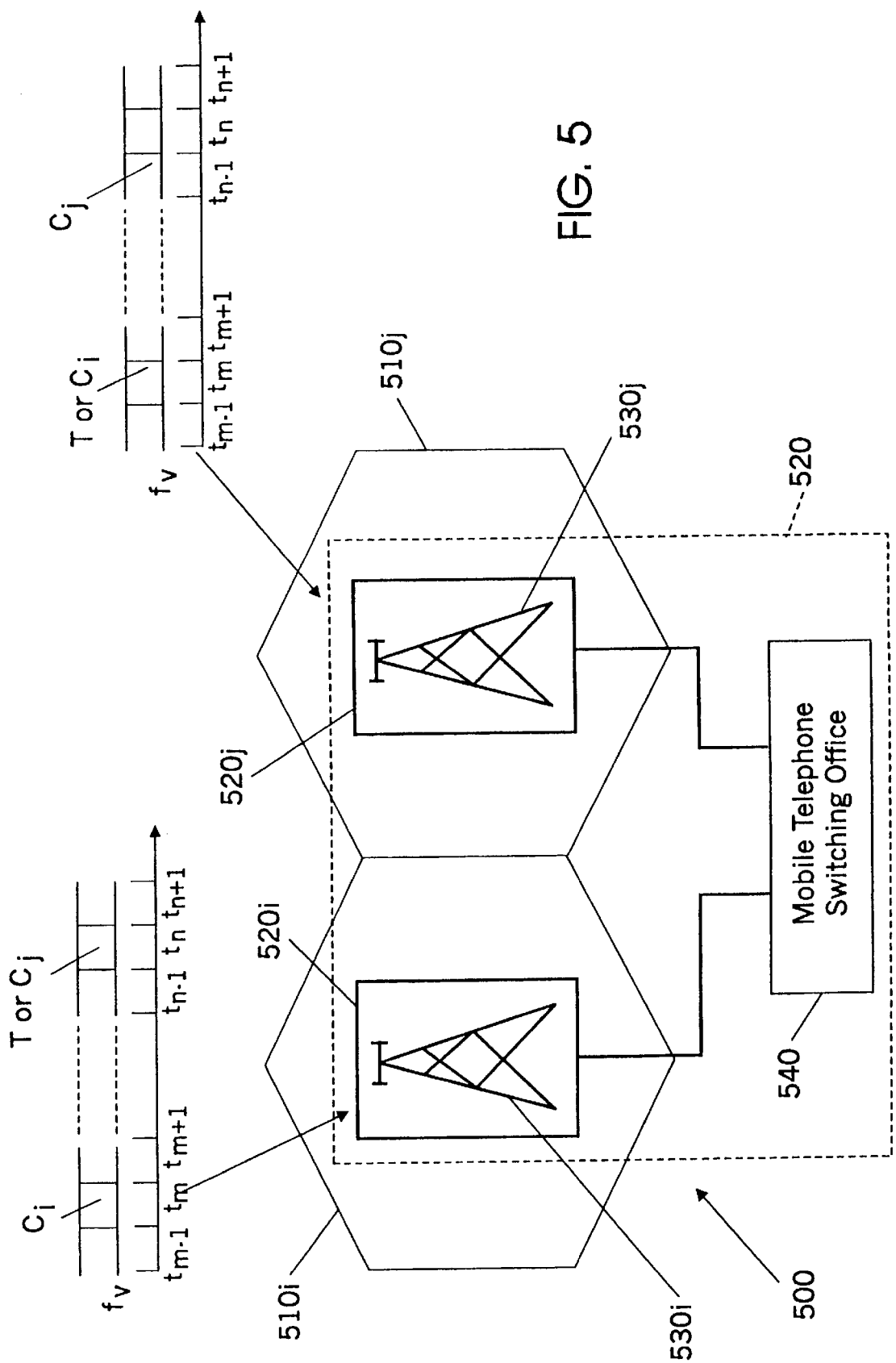
FIG. 5 illustrates a TDMA cellular radiotelephone communications system according to the present invention.

FIG. 5 illustrates an embodiment of a radiotelephone communications system 500 according to the present invention, including cells 510$i$–$j$ and time division multiple access (TDMA) communicating means 520. TDMA communicating means 520 includes first cell TDMA communicating means 520$i$ for communicating radiotelephone communications channels in a first cell 510$i$, and second cell TDMA communicating means 520$j$ for communicating radiotelephone communications channels in a second cell 510$j$.

The first cell TDMA communicating means 520$i$ communicates a first control channel $C_i$ associated with the first cell 510$i$, e.g., communicates a forward control channel from a base station to a radiotelephone or a reverse control channel from a radiotelephone to a base station, using a first time slot time/frequency window, here illustrated as a first time slot $t_m$ of a frequency band $f_y$. Similarly, the second cell TDMA communicating means 520$j$ communicates a second control channel $C_j$ associated with the second cell 510$j$, in a second time/frequency window, here illustrated as a second time slot $t_n$ of the frequency band $f_y$. The first and second control channels $C_i$, $C_j$ may be, for example, forward control channels such as a broadcast information channel (BCCH) or a paging channel (PAGCH) or reverse control channels such as a call acknowledgement channel, as, for example, specified in the GSM or IS-136 standards. It will be understood that each control channel $C_i$, $C_j$ includes information relating to the associated cell, such as a cell identification and paging information for radiotelephones within the associated cell or acknowledgement information for calls received from the cell. However, those skilled in the art will appreciate that the first and second control channels $C_i$, $C_j$ may also include information which relates to the system 500 as a whole, such as a network identification, system timing information, and the like. The first and second cell TDMA communicating means 520$i$, 520$j$ also communicate a traffic channel T and a control channel $C_i$, $C_j$ from another, preferably adjacent cell, using the same time/frequency window used to communicate the control channel in the adjacent cell. Preferably the control channel from the adjacent cell is communicated when the time/frequency window is unassigned to a traffic channel or when a traffic channel to which the time/frequency window is assigned is idle due to, for example, discontinuous transmission (DTX) arising from a pause in voice activity on the traffic channel.

Figure 3:
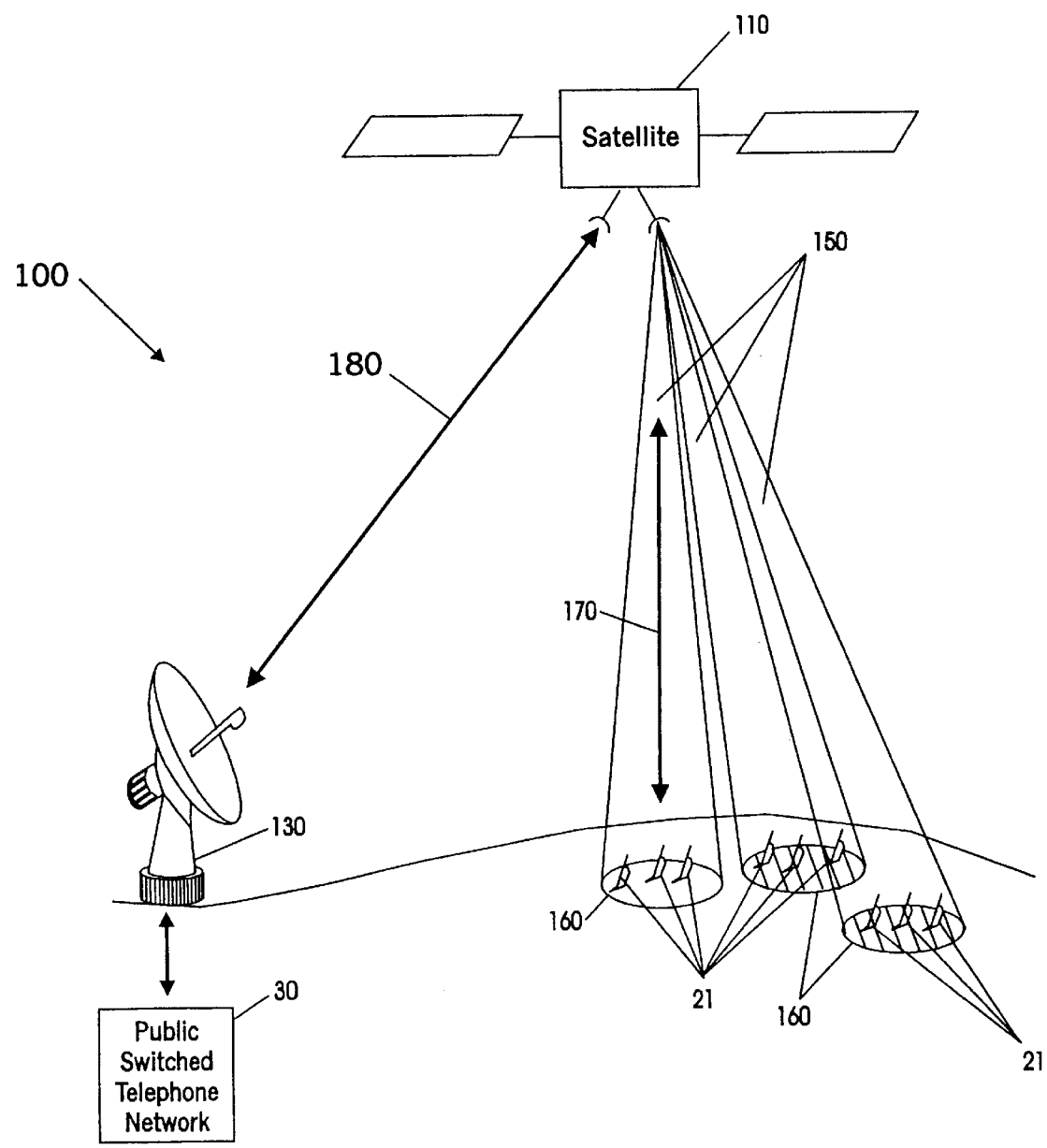
FIG. 3 illustrates a satellite-based cellular radiotelephone communications system as in the prior art.
Figure 4:
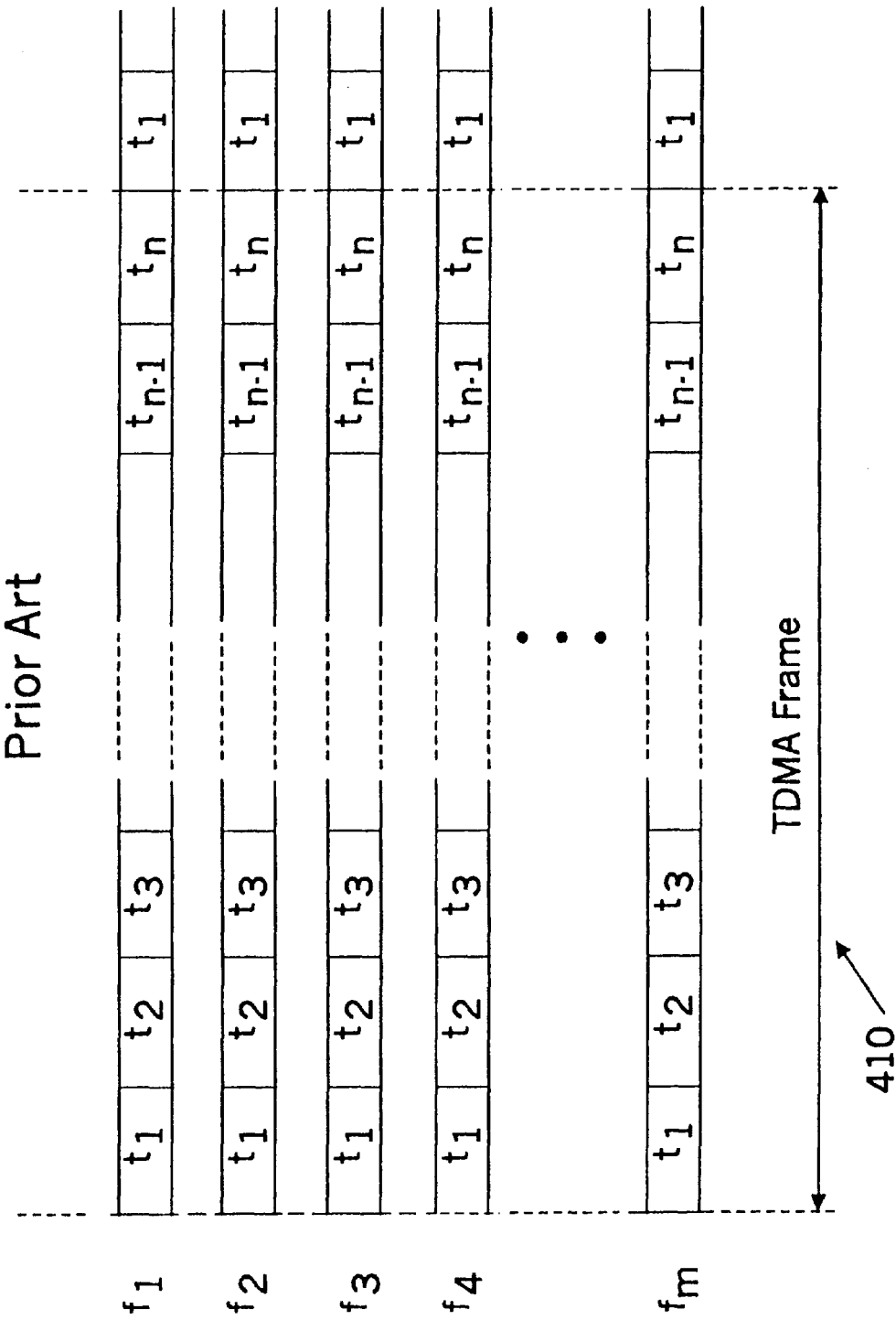
FIG. 4 illustrates time division multiple access (TDMA) frames and slots as in the prior art.

For the embodiment illustrated in FIG. 5, first and second cell TDMA communicating means 520$i$, 520$j$ are shown as located at respective terrestrial cellular base stations 530$i$, 530$j$. It will be understood by those skilled in the art that first and second cell TDMA communicating means 520$i$, 520$j$, as well as other elements of TDMA communicating means 520, may be located at base stations 530$a$–$z$, centralized in an MTSO 540 or other element of the system 500, or distributed about the cellular radiotelephone communications system 500. In addition, the first and second cell TDMA communicating means 520$i$, 520$j$ and other elements of the TDMA communicating means 520 may include portions of base stations 530$i$, 530$j$ and other elements of a terrestrial cellular radiotelephone system, as shown in FIG. 5, or may include elements which perform similar functions, such as one or more satellites 110 in a satellite-based cellular radiotelephone system such as the one illustrated in FIG. 3. It will also be understood that these and other elements of the TDMA communicating means 520 may be implemented using special purpose analog hardware, digital hardware, software running on general purpose processors, or combinations thereof.

Figure 6A:
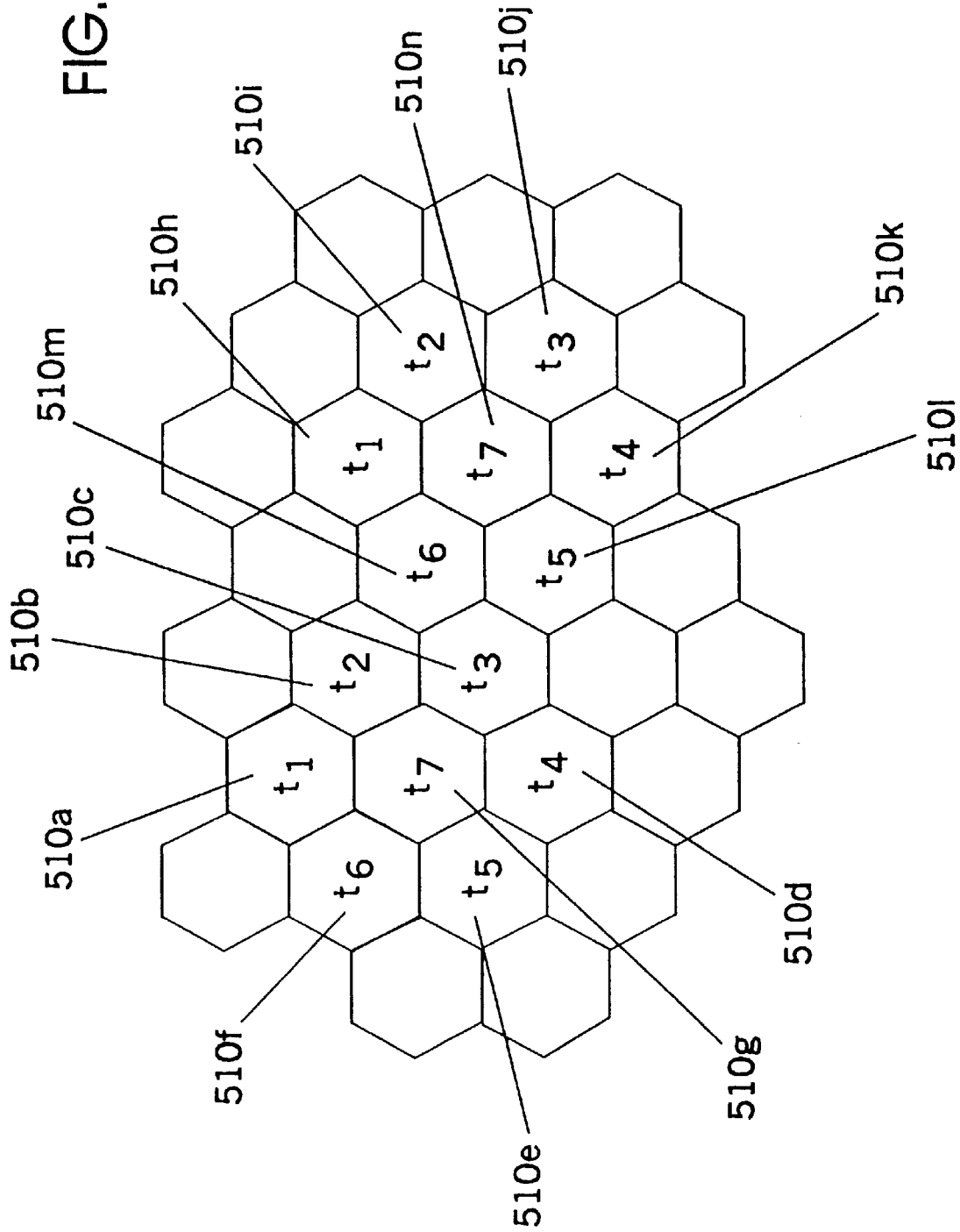

FIG. 6A illustrates reuse of the time/frequency windows, here shown as reuse of the time slots $t_1$–$t_7$ in a carrier frequency band to communicate a control channel in each of a plurality of omnidirectional coverage cells 510*a–n* of a cellular radiotelephone communications system 500 such as the one illustrated in FIG. 5. Time slots $t_1$–$t_7$ of a given frequency band preferably are reused such that the probability of interference between neighboring cells using the same time slot and frequency band for a control channel is less than a predetermined threshold. For the exemplary embodiment illustrated in FIG. 6A, adjacent cells communicate control channels on different time slots $t_1$–$t_7$ of a carrier frequency band in the cells 510*a–n* in a 7-cell reuse pattern similar to the frequency reuse pattern commonly employed in GSM systems. Those skilled in the art will understand that cells neighboring a particular cell may include cells which share theoretical "borders" with the particular cell in an idealized cell layout, i.e., "adjacent" cells, as well as cells which although not adjacent, are sufficiently close to the cell such that radiotelephone communications signals transmitted in the neighboring cells may propagate at significant signal levels into the particular cell. Those skilled in the art will also understand that different reuse patterns than that illustrated may be used with the present invention, such as time slot reuse patterns mirroring to the frequency reuse patterns commonly used in AMPS or other systems, which prevent undue interference between signals transmitted on the same frequency during the same time slot in neighboring cells.

As illustrated in FIG. 6B, frequency reuse may be also be employed according to the present invention. As illustrated, control channels may be communicated during the same time slot of reused frequency bands $f_s$–$f_z$, to communicate a control channel in each of a plurality of omnidirectional coverage cells 510*a–n* of a cellular radiotelephone communications system 500 such as the one illustrated in FIG. 5. The frequency bands $f_s$–$f_z$ preferably are reused such that the probability of interference between neighboring cells using the same frequency band during the same time slot for a control channel is less than a predetermined threshold. For the exemplary embodiment illustrated in FIG. 6B, adjacent cells communicate control channels using the same time slot using different carrier frequency bands $f_s$–$f_z$ in the cells 510*a–n* in a 7-cell reuse pattern similar to the frequency reuse pattern commonly employed in GSM systems. Those skilled in the art will understand that cells neighboring a particular cell may include cells which share theoretical "borders" with the particular cell in an idealized cell layout, i.e., "adjacent" cells, as well as cells which although not adjacent, are sufficiently close to the cell such that radiotelephone communications signals transmitted in the neighboring cells may propagate at significant signal levels into the particular cell. Those skilled in the art will also understand that different reuse patterns than that illustrated may be used with the present invention, such as frequency band reuse patterns mirroring to the frequency reuse patterns commonly used in AMPS or other systems, which prevent undue interference between signals transmitted on the same frequency during the same time slot in neighboring cells. Those skilled in the art will also appreciate that time slot and carrier frequency band reuse may be used in combination according to the present invention. Those skilled in the art will appreciate that the present invention is not limited to systems having cells illuminated by omnidirectional antennas, but may also be used in systems employing directional antennas to illuminate multiple cells from a particular base station location.

Figure 7:
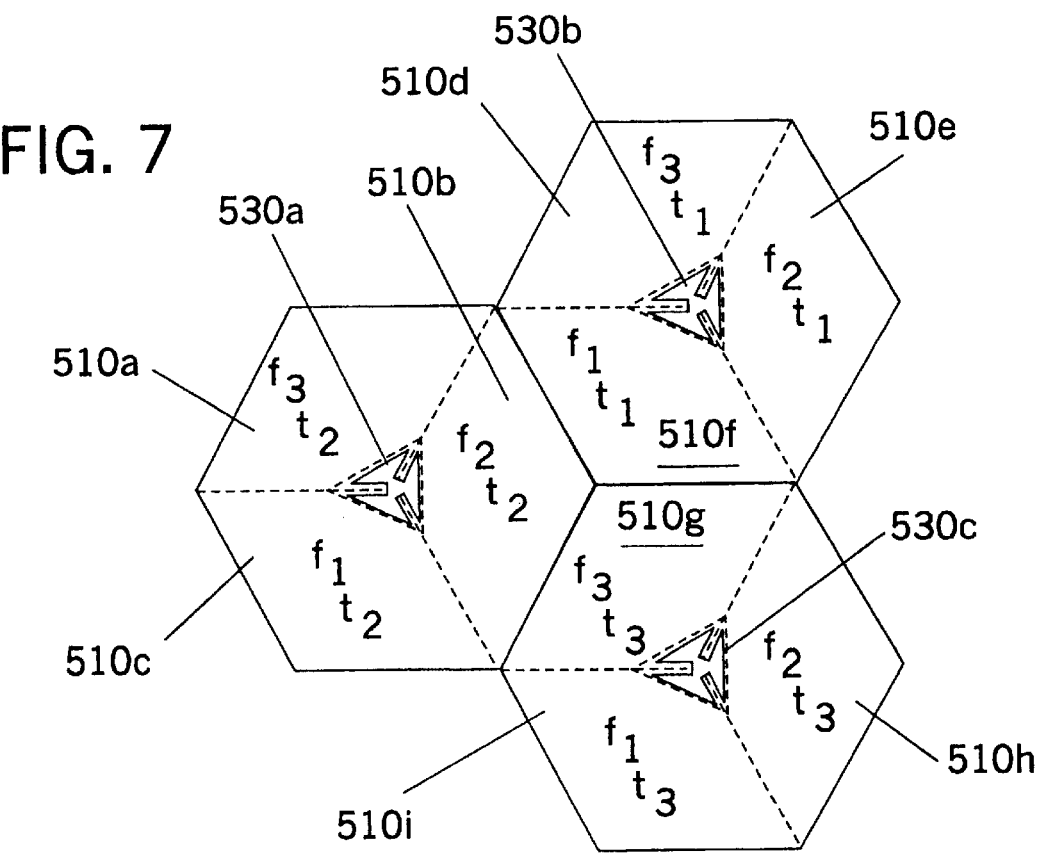
FIG. 7 illustrates time slot reuse for communicating control channels in a plurality of sector cells according to the present invention.

FIG. 7 illustrates an embodiment of the present invention for a cellular system which includes a plurality of sector cells 510*a–i* served by base stations 530*a–c*. As illustrated, three different carrier frequency bands $f_1$–$f_3$ are used to communicate control channels in the group of sector cells 510, while groups of sector cells use different time slots $t_1$–$t_3$ on the same three frequency bands. Those skilled in the art will understand that other sectorizations may be used with the present invention, for example, patterns in which more or less than three cells are served by a single base station site. It will also be understood that other reuse patterns for the time slots may be used with the present invention to ensure that a minimum distance is maintained between sectors using the same time/frequency window, in order to keep cochannel interference at an acceptable level.

FIGS. 8A–C are tables illustrating various time/frequency window allocations according to the present invention, in particular, the use of a time/frequency window that is used to communicate a control channel $C_i$ in one cell (or sector) i, and to communicate voice, data or other traffic on traffic channels in other cells (or sectors) j, k. For the embodiments illustrated in FIGS. 8A–C, the time slots $t_1$–$t_8$ for the cells i, j, k preferably are synchronized. For example, a global time reference may be provided to base stations serving the cells i, j, k using a satellite time reference such as that provided by the Global Positioning System (GPS).

Those skilled in the art will understand that a time/frequency window may be unassigned to a traffic channel in a cell, due to system load or frequency hopping, for example. In addition, a time/frequency window may be assigned to a traffic channel in a cell, but the traffic channel to which the time/frequency window is assigned may be idle, for example, because of lack of speech activity in a voice traffic channel or absence of a pending data packet in a data traffic channel. For example, those skilled in the art will appreciate that in a typical radiotelephone system, a traffic channel may be unused for a significant portion of the available time line, as low as 50% or less, because of the "talk-then-listen" character of typical communications sessions, i.e., users tend not to transmit voice information while receiving voice information from a user on the other end of a duplex link. In addition to this listening time, radiotelephone communications often include an additional significant amount of "dead time," i.e., time during which neither party is communicating, which may further decrease the probability of cochannel interference events. Accordingly, the probability of cochannel interference between a control channel $C_i$ using a particular time/frequency window in a first cell i and traffic channels using the same time/frequency window in neighboring cells j, k may be low. The probability of interference may be further reduced in systems which employ frequency hopping for traffic channels, such as the frequency hopping employed in GSM systems, because for a system having significant periods of less than full loading, that is, periods when all the available time slots are not allocated to traffic, the likelihood that a given time slot will be assigned to a traffic channel may be decreased.

According to the embodiment illustrated in FIG. 8A, a time slot $t_i$ of a frequency band $f_u$ in a first cell i which is unassigned to a traffic channel or which is assigned to a traffic channel which is idle may be used to communicate control channels for other, preferably adjacent, cells j, k. Communicating a control channel on idle or unassigned time slots in neighboring cells can help radiotelephones to more easily capture the control channel, because the signals from multiple signal paths may be combined in the radiotelephone's equalizer to achieve diversity-enhanced reception. As is well-known, diversity transmission, sometimes referred to as "simulcast," can increase signal gain in the presence of fading and similar propagation loss, because signals from multiple paths generally exhibit uncorrelated fading. Similarly, as illustrated in FIG. 8B, the same time slot may be used to communicate control channels using different frequency bands $f_u$–$f_x$ in cells i, j, k, and unassigned or idle time slots $t_1$ on frequency bands $f_v$, $f_x$ in one cell i may be used to communicate control channels associated with the other cells j, k. As illustrated in FIG. 8C, different time slots and carrier frequency bands may be used for control channels in the cells i, j, k, and unassigned or idle time/frequency windows in one of the cells i, used for communicating control channels in neighboring cells j, k, may be used to communicate these control channels in the one cell i.

In sum, according to the present invention, a system which utilizes frequency hopping for traffic channels can achieve interference averaging for a control channel communicated using a particular time/frequency window in a cell because the same traffic channel is not always used in the same time/frequency window in adjacent cells. Power levels used for one these traffic channels may also be varied, for example, by reducing the power level as the distance between the communicating radiotelephone and the base station decreases, thus offering further reduction of the likelihood of interference between traffic channels and control channels DTX may be used for the traffic channels to provide a further decrease in the likelihood of interference between traffic channels and control channels from neighboring cells. The unassigned or otherwise idle time/frequency windows may be used to communicate control channels for nearby cells, providing increased gain for these control channels. The increased gain can allow reduction in the size of reuse patterns for the carrier frequency bands and time slot, which can potentially increase spectral utilization. Those skilled in the art will understand that although DTX can generally provide increased capacity for interference-limited systems such as code division multiple access (CDMA) systems, using the increased capacity freed by DTX to communicate control channels according to the present invention can target the benefits of DTX to cell-edge radiotelephones which may need increased capacity more than radiotelephones located near base stations.

FIG. 9 illustrates a radiotelephone 21 for communicating with a TDMA radiotelephone system 500 as described herein. The radiotelephone 21 includes TDMA control channel communicating means 910 for communicating, e.g., sending or receiving, a first control channel associated with a first cell over one of the carrier frequency bands using a first time/frequency window and for communicating a second control channel associated with a second cell using a second time/frequency window. The radiotelephone 21 also includes TDMA traffic channel communicating means 920 for communicating a traffic channel using the second time/frequency window, and preferably includes means for communicating a frequency hopped traffic channel on different carrier frequency bands, as in a GSM system. Those skilled in the art will appreciate that the TDMA control channel communicating means 910 and the TDMA traffic channel communicating means 920 may include common radiotelephone components such as radio receivers and transmitters. It will also be understood that the TDMA control channel communicating means 910 and the TDMA traffic channel communicating means 920 may be implemented using special purpose analog hardware, digital hardware, software running on general purpose processors, or combinations thereof. Other typical elements of a radiotelephone 21, such as a keypad, display, processor, speaker, microphone and the like, are not illustrated in FIG. 9.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A cellular radiotelephone communications system, the system comprising:

a plurality of cells for communicating with radiotelephones; and time division multiple access (TDMA) communicating means for communicating radiotelephone communications channels in a plurality of cells over a plurality of carrier frequency bands during a plurality of sequential time slots such that said plurality of carrier frequency bands and said plurality of time slots define a plurality of time/frequency windows, said TDMA communicating means including:

first cell TDMA communicating means for communicating radiotelephone communications channels in a first cell, said first cell TDMA communicating means communicating a first control channel associated with said first cell using a first time/frequency window; and second cell TDMA communicating means for communicating radiotelephone communications channels in a second cell, said second cell TDMA communicating means communicating said first control channel and a traffic channel using said first time/frequency window, said second cell TDMA communicating means communicating said first control channel in said second cell using said first time/frequency window when said first time/frequency window is not used for communication of a traffic channel.

2. A system according to claim 1, wherein said second cell TDMA communicating means communicates said first control channel in said second cell using said first time/frequency window when said first time/frequency window is unassigned to a traffic channel in said second cell.

3. A system according to claim 1, wherein said second cell TDMA communicating means communicates said first control channel in said second cell using said first time/frequency window when a traffic channel to which said first time/frequency window is assigned is idle.

4. A system according to claim 1 wherein said second cell TDMA communicating means communicates a traffic channel to which said first time/frequency window is assigned over different carrier frequency bands to thereby frequency hop said traffic channel.

5. A system according to claim 1 wherein said second cell TDMA communicating means includes a base station which communicates a traffic channel to a radiotelephone using said first time/frequency window at a signal power level which decreases as the distance between the base station and the radiotelephone decreases.

6. A system according to claim 1 wherein said TDMA communicating means further comprises:

third cell TDMA communicating means for communicating radiotelephone communications channels in a third cell, said third cell TDMA communicating means communicating a third control channel associated with said third cell using said first time/frequency window.

7. A system according to claim 1:
wherein said plurality of cells comprises a plurality of groups of sector cells, each of said groups served by a radiotelephone base station;
wherein said first cell comprises a cell of a first group of sector cells; and
wherein said second cell comprises a cell of a second group of sector cells.

8. A system according to claim 1 wherein said second cell neighbors said first cell.

9. A system according to claim 1:
wherein said second cell communicating means communicates a second control channel associated with said second cell using a second time/frequency window; and
wherein said first cell TDMA communicating means communicates said second control channel and a traffic channel in said first cell using said second time/frequency window.

10. A system according to claim 9:
wherein said first cell TDMA communicating means communicates said first control channel in said first cell over one of said carrier frequency bands during a first time slot; and
wherein said second cell TDMA communicating means communicates said second control channel in said second cell over said one carrier frequency band during a second time slot.

11. A system according to claim 9:
wherein said first cell TDMA communicating means communicates said first control channel over a first carrier frequency band during one of the plurality of time slots; and
wherein said second cell TDMA communicating means communicates said second control channel over a second carrier frequency band during said one time slot.

12. A cellular radiotelephone communications system, the system comprising:
a plurality of cells for communicating with radiotelephones; and
adjacent cell communicating means for communicating a first control channel associated with a first cell of said plurality of cells in said first cell using a first time/frequency window and for communicating said first control channel and a traffic channel in a second cell adjacent said first cell using said first time/frequency window, said adjacent cell communicating means communicating, said first control channel when said first time/frequency window is not used for communication of a traffic channel.

13. A system according to claim 12, wherein said adjacent cell communicating means communicates said first control channel in said second cell using said first time/frequency window when said first time/frequency window is unassigned to a traffic channel in said second cell.

14. A system according to claim 13, wherein said adjacent cell control channel communicating means communicates said first control channel in said second cell using said first time/frequency window when a traffic channel to which said first time/frequency window is assigned in said second cell is idle.

15. A system according to claim 12, wherein said adjacent cell communicating means communicates a traffic channel to which said first time/frequency window is assigned in said second cell over different carrier frequency bands to thereby frequency hop said traffic channel.

16. A system according to claim 12, wherein said adjacent cell communicating means includes a base station which communicates a traffic channel to a radiotelephone using said first time/frequency window at signal power level which decreases as the distance between the base station and the radiotelephone decreases.

17. A system according to claim 12:
wherein said plurality of cells comprises a plurality of groups of sector cells, each of said groups served by a radiotelephone base station;
wherein said first cell comprises a cell of a first group of sector cells; and
wherein said second cell comprises a cell of a second group of sector cells.

18. A system according to claim 12, wherein said adjacent cell communicating means comprises means for communicating a second control channel associated with said second cell in said second cell using a second time/frequency window and for communicating said second control channel and a traffic channel in said first cell using said second time/frequency window.

19. A system according to claim 18, wherein said adjacent cell communicating means communicates said first control channel in said first cell over one of said carrier frequency bands during a first time slot and communicates second control channel in said second cell over said one carrier frequency band during a second time slot.

20. A system according to claim 18, wherein said adjacent cell communicating means communicates said first control channel in said first cell over a first carrier frequency band during one of the plurality of time slots and communicates said second control channel in said second cell over a second carrier frequency band during said one time slot.

21. A radiotelephone for communicating in a time division multiple access (TDMA) cellular radiotelephone communications system, the radiotelephone communications system including a plurality of cells for communicating with radiotelephones using a plurality of radiotelephone communications channels communicated in the plurality of cells over a plurality of carrier frequency bands during a plurality of sequential time slots such that the plurality of carrier frequency bands and the plurality of time slots define a plurality of time/frequency windows, the radiotelephone comprising:
TDMA control channel communicating means for communicating a first control channel associated with a first cell using a first time/frequency window and for communicating a second control channel associated with a second cell using a second time/frequency window, said TDMA control channel communicating means communicating said second control channel in said second time/frequency window when said second time/frequency window is not used for communication of a traffic channel; and
TDMA traffic channel communicating means for communicating a traffic channel using said second time/frequency window.

22. A radiotelephone according to claim 21, wherein said TDMA control channel communicating means communicates said second control channel when said second time/frequency window is unassigned to a traffic channel.

23. A radiotelephone according to claim 21, wherein said TDMA control channel communicating means communicates said second control channel when a traffic channel to which said second time/frequency window is assigned is idle.

24. A radiotelephone according to claim 21 wherein said TDMA traffic channel communicating means communicates a traffic channel to which said second time/frequency window is assigned over different frequency bands to thereby frequency hop said traffic channel.

25. A base station for communicating with radiotelephones in a time division multiple access (TDMA) cellular radiotelephone communications system, the radiotelephone communications system including a plurality of cells for communicating with radiotelephones using a plurality of radiotelephone communications channels communicated in the plurality of cells over a plurality of carrier frequency bands during a plurality of sequential time slots such that the plurality of carrier frequency bands and the plurality of time slots define a plurality of time/frequency windows, the radiotelephone comprising:

means for communicating a first control channel associated with a first cell in a first cell using a first time/frequency window; and means for communicating a traffic channel and a second control channel associated with a second cell in said first cell using a second time/frequency window, said means for communicating a traffic channel and a second control channel communicating said second control channel using said second time/frequency window when said second time/frequency window is not used for communication of a traffic channel.

26. A base station according to claim 25, wherein said means for communicating a traffic channel and a second control channel communicates said second control channel when said second time/frequency window is unassigned to a traffic channel.

27. A base station according to claim 25, wherein said means for communicating a traffic channel and a second control channel communicates said second control channel when a traffic channel to which said second time/frequency window is assigned is idle.

28. A base station according to claim 27, wherein said means for communicating a traffic channel and a second control channel communicates a traffic channel to which said second time/frequency window is assigned over different carrier frequency bands to thereby frequency hop said traffic channel.

29. A base station according to claim 27, wherein said means for communicating a traffic channel and a second control channel communicates a traffic channel to a radiotelephone at a signal power level which decreases as the distance between the base station and the radiotelephone decreases.

30. A method of communicating in a time division multiple access (TDMA) radiotelephone communications system, the radiotelephone system including a plurality of cells for communicating with radiotelephones using a plurality of radiotelephone channels communicated over a plurality of carrier frequency bands during a plurality of sequential time slots such that the plurality of carrier frequency bands and the plurality of time slots define a plurality of time/frequency windows, the method comprising the steps of:

communicating a first control channel associated with a first cell in the first cell using a first time/frequency window; and communicating the first control channel and a traffic channel in a second cell using the first time/frequency window, wherein the first control channel is transmitted in the second cell using the first time/frequency window when the first time/frequency window is not used for communication of a traffic channel.

31. A method according to claim 30, wherein said step of communicating the first control channel and a traffic channel comprises the step of communicating the first control channel in the second cell when the first time/frequency window is unassigned to a traffic channel in the second cell.

32. A method according to claim 30, further comprising the step of assigning the first time/frequency window to a traffic channel in the second cell, and wherein said step of communicating the first control channel and a traffic channel comprises the step of communicating the first control channel in the second cell when the traffic channel to which the first time/frequency window is assigned in the second cell is idle.

33. A method according to claim 32, further comprising the step of communicating the traffic channel to which the first time/frequency window is assigned in the second cell over different carrier frequency bands to thereby frequency hop the traffic channel.

34. A method according to claim 30, wherein the second cell is served by a base station, and wherein said step of communicating a traffic channel and a first control channel comprises the step of communicating a traffic channel between the base station and a radiotelephone using the first time/frequency window at a signal power level which decreases as the distance between the base station and the radiotelephone decreases.

35. A method according to claim 30, further comprising the step of communicating a third control channel associated with a third cell in the third cell using the first time/frequency window.

36. A method according to claim 30, wherein the plurality of cells comprises a plurality of groups of sector cells, each of the groups served by a radiotelephone base station, wherein the first cell comprises a cell of a first group of sector cells, and wherein the second cell comprises a cell of a second group of sector cells.

37. A method according to claim 30, wherein the second cell neighbors the first cell.

38. A method according to claim 30, further comprising the steps of:

communicating a second control channel associated with the second cell in the second cell using a second time/frequency window; and communicating a traffic channel and the second control channel and a traffic channel in the first cell using the second time/frequency window.

39. A method according to claim 38:

wherein said step of communicating a first control channel in the first cell comprises the step of communicating the first control channel in the first cell over one of the carrier frequency bands during a first time slot; and wherein said step of communicating a second control channel in the second cell comprises the step of communicating the second control channel in the second cell over the one carrier frequency band during a second time slot.

40. A method according to claim 38:

wherein said step of communicating a first control channel in the first cell comprises the step of communicating the first control channel in the first cell over a first carrier frequency band during one of the plurality of time slots; and wherein said step of communicating a second control channel in the second cell comprises the step of communicating the second control channel in the second cell over a second carrier frequency band during the one time slot.

41. A method of communicating in a time division multiple access (TDMA) radiotelephone communications system, the radiotelephone system including a plurality of cells for communicating with radiotelephones using a plurality of radiotelephone channels communicated over a plurality of carrier frequency bands during a plurality of sequential time slots, the method comprising the steps of:

communicating a first control channel associated with a first cell in the first cell over a first carrier frequency band during a first time slot; and communicating the first control channel in a second cell over the first carrier frequency band during the first time slot when no traffic channel is assigned to use the first carrier frequency band in the second cell during the first time slot or when a traffic channel assigned to use the first carrier frequency band in the second cell during the first time slot is idle.

42. A method according to claim 41, further comprising the step of communicating a traffic channel which is assigned to use the first carrier frequency band in the second cell during the first time slot over different carrier frequency bands to thereby frequency hop the traffic channel.

43. A method according to claim 42, further comprising the steps of:

communicating a second control channel associated with the second cell in the second cell over a second carrier frequency band during the first time slot; and communicating the second control channel in the first cell over the second carrier frequency band during the first time slot when no traffic channel is assigned to use the second carrier frequency band in the first cell during the first time slot or when a traffic channel assigned to use the second carrier frequency band in the first cell during the first time slot is idle.

44. A method according to claim 43, further comprising the step of communicating a traffic channel which is assigned to use the second carrier frequency band in the first cell during the first time slot over different carrier frequency bands to thereby frequency hop the traffic channel.

45. A method according to claim 42, further comprising the steps of:

communicating a second control channel associated with the second cell in the second cell over the first carrier frequency band during a second time slot; and communicating the second control channel in the first cell over the first carrier frequency band during the second time slot when no traffic channel is assigned to use the first carrier frequency band in the first cell during the second time slot or when a traffic channel which is assigned to use the first carrier frequency band in the first cell during the second time slot is idle.

46. A method according to claim 45, further comprising the step of communicating a traffic channel which is assigned to use the first carrier frequency band in the first cell during the second time slot over different carrier frequency bands to thereby frequency hop the traffic channel.

47. A method of communicating control channels and traffic channels in a time division multiple access (TDMA) radiotelephone communications system, the radiotelephone communications system including a plurality of cells for communicating with radiotelephones using a plurality of radiotelephone channels communicated over a plurality of carrier frequency bands during a repetitive frame divided into sequential time slots, the method comprising the steps of:

communicating a first control channel associated with a first cell in the first cell over a first carrier frequency band during a first time slot of the repetitive frame;

communicating a second control channel associated with a second cell in the second cell over a second carrier frequency band during a second time slot of the repetitive frame;

communicating a traffic channel in the second cell over multiple carrier frequency bands including the first carrier frequency band to thereby frequency hop the traffic channel, the frequency-hopped traffic channel being communicated in the second cell over the first carrier frequency band during the first time slot; and communicating the first control channel in the second cell over the first carrier frequency band during the first time slot when the first carrier frequency band is unused for communicating traffic in the second cell during the first time slot.

48. A method according to claim 47, wherein said step of communicating the first control channel in the second cell over the first carrier frequency band during the first time slot when the first carrier frequency band is unused for communicating traffic during the first time slot comprises the step of communicating the first control channel in the second cell over the first carrier frequency band during the first time slot during a pause in speech activity in a traffic channel assigned to use the first carrier frequency band in the second cell during the first time slot.

49. A method according to claim 47:

wherein said step of communicating a traffic channel in the second cell comprises the step of communicating a data packet over a traffic channel assigned to the first carrier frequency band and the first time slot between a radiotelephone and base station serving the second cell; and wherein said step of communicating the first control channel in the second cell over the first carrier frequency band during the first time slot when the first carrier frequency band is unused for communicating traffic during the first time slot comprises the step of communicating the first control channel in the second cell over the first carrier frequency band during the first time slot when no data packet is pending for communication between the base station and the radiotelephone over the first carrier frequency band during the first time slot.

50. A method according to claim 47, further comprising the step of communicating a second traffic channel in the first cell over multiple carrier frequency bands including the second carrier frequency band to thereby frequency hop the second traffic channel, the frequency-hopped second traffic channel being communicated in the first cell over the second carrier frequency band during the second time slot.

51. A method according to claim 50, further comprising the step of communicating the second control channel in the first cell over the second carrier frequency band during the second time slot when the second carrier frequency band is unused for communicating traffic in the first cell during the second time slot.

52. A method according to claim 47, further comprising the step of communicating a third control channel associated with a third cell in the third cell over the first carrier frequency band during the first time slot of the repetitive frame.

53. A method of communicating control channels and traffic channels in a time division multiple access (TDMA) radiotelephone communications system, the radiotelephone communications system including a plurality of cells for communicating with radiotelephones using a plurality of radiotelephone channels communicated over a plurality of carrier frequency bands during a repetitive frame divided into sequential time slots, the method comprising the steps of:

communicating a first control channel associated with a first cell in the first cell over a first carrier frequency band during a first time slot of the repetitive frame;

communicating a second control channel associated with a second cell in the second cell over the first carrier frequency band during a second time slot of the repetitive frame;

communicating a traffic channel in the second cell over multiple carrier frequency bands including the first carrier frequency band to thereby frequency hop the traffic channel, the frequency-hopped traffic channel being communicated in the second cell over the first carrier frequency band during the first time slot; and communicating the first control channel in the second cell over the first carrier frequency band during the first time slot when the first carrier frequency band is unused for communicating traffic in the second cell during the first time slot.

54. A method according to claim 53, wherein said step of communicating the first control channel in the second cell over the first carrier frequency band during the first time slot when the first carrier frequency band is unused for communicating traffic during the first time slot comprises the step of communicating the first control channel in the second cell over the first carrier frequency band during the first time slot during a pause in speech activity in a traffic channel assigned to use the first carrier frequency band during the first time slot.

55. A method according to claim 53:

wherein said step of communicating a traffic channel in the second cell comprises the step of communicating a data packet over a traffic channel assigned to the first carrier frequency band and the first time slot between a radiotelephone and a base station serving the second cell; and wherein said step of communicating the first control channel in the second cell over the first carrier frequency band during the first time slot when the first carrier frequency band is unused for communicating traffic during the first time slot comprises the step of communicating the first control channel in the second cell over the first carrier frequency band during the first time slot when no data packet is pending for communication between the base station and the radiotelephone over the first carrier frequency band during the first time slot.

56. A method according to claim 53, further comprising the step of communicating a second traffic channel in the first cell over multiple carrier frequency bands including the first carrier frequency band to thereby frequency hop the second traffic channel, the frequency-hopped second traffic channel being communicated in the first cell over the first carrier frequency band during the second time slot.

57. A method according to claim 56, further comprising the step of communicating the second control channel in the first cell over the first carrier frequency band during the second time slot when the first carrier frequency band is unused for communicating traffic in the first cell during the second time slot.

58. A method according to claim 53, further comprising the steps of communicating a third control channel associated with a third cell in the third cell over the first carrier frequency band during the first time slot of the repetitive frame.

59. A method of communicating control channels and traffic channels in a time division multiple access (TDMA) radiotelephone communications system, the radiotelephone communications system including a plurality of cells for communicating with radiotelephones using a plurality of radiotelephone channels communicated over a plurality of carrier frequency bands during a repetitive frame divided into sequential time slots, the method comprising the steps of:

communicating a first control channel associated with a first cell in the first cell over a first carrier frequency band during a first time slot of the repetitive frame;

communicating a second control channel associated with a second cell in the second cell over a second carrier frequency band during the first time slot of the repetitive frame;

communicating a traffic channel in the second cell over multiple carrier frequency bands including the first carrier frequency band to thereby frequency hop the traffic channel, the frequency-hopped traffic channel being communicated in the second cell over the first carrier frequency band during the first time slot; and communicating the first control channel in the second cell over the first carrier frequency band during the first time slot when the first carrier frequency band is unused for communicating traffic during the first time slot.

60. A method according to claim 59, wherein said step of communicating the first control channel in the second cell over the first carrier frequency band during the first time slot when the first carrier frequency band is unused for communicating traffic during the first time slot comprises the step of communicating the first control channel in the second cell over the first carrier frequency band during the first time slot during a pause in speech activity in a traffic channel assigned to use the first carrier frequency band in the second cell during the first time slot.

61. A method according to claim 59:

wherein said step of communicating a traffic channel in the second cell comprises the step of communicating a data packet over a traffic channel assigned to the first carrier frequency band and the first time slot between a radiotelephone and a base station serving the second cell; and wherein said step of communicating the first control channel in the second cell over the first carrier frequency band during the first time slot when the first carrier frequency band is unused for communicating traffic during the first time slot comprises the step of communicating the first control channel in the second cell over the first carrier frequency band during the first time slot when no data packet is pending for communication between the base station and the radiotelephone over the first carrier frequency band during the first time slot.

62. A method according to claim 59, further comprising the step of communicating a traffic channel in the first cell over multiple carrier frequency bands including the second carrier frequency band to thereby frequency hop the traffic channel, the frequency-hopped traffic channel being communicated in the first cell over the second carrier frequency band during the first time slot.

63. A method according to claim 62, further comprising the step of communicating the second control channel in the first cell over the second carrier frequency band during the first time slot when the second carrier frequency band is unused for communicating traffic in the first cell during the first time slot.

64. A method according to claim 59, further comprising the step of communicating a third control channel associated with a third cell in the third cell over the first carrier frequency band during the first time slot of the repetitive frame.

65. A method for communicating broadcast control channel information to mobile stations in a time division multiple access cellular communications system divided into a plurality of geographical cells, the method comprising the steps of:
   allocating a first time slot in a repetitive TDMA frame period for communicating broadcast control information for mobile stations in a first cell using a first radio channel frequency;
   allocating a second time slot in said repetitive TDMA frame period for communicating broadcast control information for mobile stations in a second cell using a second radio channel frequency;
   allocating said first time slot in said repetitive TDMA frame period for communicating speech or data traffic information for a mobile station in said second cell using frequency hopping within a set of hop frequencies including said first radio channel frequency; and
   when said first radio channel frequency is temporarily unused for traffic transmission in said second cell in said first time slot, transmitting the same broadcast control information as transmitted in said first cell during said first time slot on said first radio channel frequency.

66. The method of claim 65, further comprising the step of: allocating said second time slot in said repetitive TDMA frame period for communicating traffic channel information for a mobile station in said first cell using frequency hopping within a set of hop frequencies including said second radio channel frequency.

67. The method of claim 66, further comprising the step of:
   whenever said second radio channel frequency is temporarily unused for traffic transmission in said first cell during said second time slot, transmitting the same broadcast control information as transmitted in said second cell during said second time slot using said second radio channel frequency.

68. The method of claim 65, further comprising the steps of:
   allocating a third time slot in said repetitive TDMA frame period for communicating broadcast control information for mobile stations in a third cell using a third radio channel frequency; and
   allocating said first time slot in said repetitive TDMA frame period for communicating traffic channel information for a mobile station in said third cell using frequency hopping within a set of hop frequencies including said first and said second radio channel frequencies.

69. The method of claim 65, wherein said first time slot is not used for traffic transmission during pauses in speech activity in the direction of transmission cellular system to mobile station.

70. The method of claim 65, wherein said first time slot is not used for traffic transmission when no data packet is waiting for transmission in the direction of transmission cellular system to mobile station.

71. A method for communicating broadcast control channel information to mobile stations in a time division multiple access cellular communications system divided into a plurality of geographical cells, the method comprising the steps of:
   allocating a first time slot in a repetitive TDMA frame period for communicating broadcast control information for mobile stations in a first cell using a first radio channel frequency;
   allocating a second time slot in said repetitive TDMA frame period for communicating broadcast control information for mobile stations in a second cell using said first radio channel frequency;
   allocating said first time slot in said repetitive TDMA frame period for communicating speech or data traffic information for a mobile station in said second cell using frequency hopping within a set of hop frequencies including said first radio channel frequency; and
   when said first radio channel frequency is temporarily unused for traffic transmission in said second cell during said time slot, transmitting the same broadcast control information as transmitted in said first cell during said first time slot using said first radio channel frequency.

72. The method of claim 71, further comprising the step of:
   allocating said second time slot in said repetitive TDMA frame period for communicating traffic channel information for a mobile station in said first cell using frequency hopping within a set of hop frequencies including said first radio channel frequency.

73. The method of claim 72, further comprising the step of:
   whenever said first radio channel frequency is temporarily unused for traffic transmission in said first cell during said second time slot, transmitting the same broadcast control information as transmitted in said second cell during said second time slot using said first radio channel frequency.

74. The method of claim 71, further comprising the steps of:
   allocating a third time slot in said repetitive TDMA frame period for communicating broadcast control information for mobile stations in a third cell using said first radio channel frequency; and
   allocating said first time slot in said repetitive TDMA frame period for communicating traffic channel information for a mobile station in said third cell using frequency hopping within a set of hop frequencies including said first radio channel frequency.

75. The method of claim 74, further comprising the step of:
   allocating said second time slot in said repetitive TDMA frame period for communicating traffic channel information for another mobile station in said third cell using frequency hopping within a set of hop frequencies including said first radio channel frequency.

76. The method of claim 71, wherein said first time slot is not used for traffic transmission during pauses in speech activity in the direction of transmission cellular system to mobile station.

77. The method of claim 71, wherein said first time slot is not used for traffic transmission when no data packet is waiting for transmission in the direction of transmission cellular system to mobile station.

78. A method for communicating broadcast control channel information to mobile stations in a time division multiple access cellular communications system divided into a plurality of geographical cells, the method comprising the steps of:

allocating a first time slot in a repetitive TDMA frame period for communicating broadcast control information for mobile stations in a first cell using a first radio channel frequency;

allocating said first time slot in said repetitive TDMA frame period for communicating broadcast control information for mobile stations in a second cell using a second radio channel frequency;

allocating said first time slot in said repetitive TDMA frame period for communicating speech or data traffic information for a mobile station in said second cell using frequency hopping within a set of hop frequencies including said first radio channel frequency; and when said first radio channel frequency is temporarily unused for traffic transmission in said second cell during said first time slot, transmitting the same broadcast control information as transmitted in said first cell during said first time slot using said first radio channel frequency.

79. The method of claim 78, further comprising the step of:

allocating said first time slot in said repetitive TDMA frame period for communicating traffic channel information for a mobile station in said first cell using frequency hopping within a set of hop frequencies including said second radio channel frequency.

80. The method of claim 79, further comprising the step of:

whenever said second radio channel frequency is temporarily unused for traffic transmission in said first cell during said first time slot, transmitting the same broadcast control information as transmitted in said second cell during said first time slot using said second radio channel frequency.

81. The method of claim 78, further comprising the steps of:

allocating said first time slot in said repetitive TDMA frame period for communicating broadcast control information for mobile stations in a third cell using a third radio channel frequency; and allocating said second time slot in said repetitive TDMA frame period for communicating traffic channel information for a mobile station in said third cell using frequency hopping within a set of hop frequencies including said first and said second radio channel frequencies.

82. The method of claim 81, further comprising the step of:

allocating said second time slot in said repetitive TDMA frame period for communicating traffic channel information for a mobile station in said first cell using frequency hopping with a set of hop frequencies including said first and said third radio channel frequencies.

83. The method of claim 78, wherein said first time slot is not used for traffic transmission occur during pauses in speech activity in the direction of transmission cellular system to mobile station.

84. The method of claim 78, wherein said first time slot is not used for traffic transmission occur when no data packet is waiting for transmission in the direction of transmission cellular system to mobile station.

85. A method for receiving service request control messages or call acknowledgement control messages from mobile stations in a time division multiple access cellular communications system divided into a plurality of geographical cells, the method comprising the steps of:

allocating a first time slot in a repetitive TDMA frame period for receiving said control messages from mobile stations in a first cell using a first radio channel frequency;

allocating a second time slot in said repetitive TDMA frame period for receiving said control messages from mobile stations in a second cell using a second radio channel frequency;

allocating said first time slot in said repetitive TDMA frame period for receiving speech or data traffic from a mobile station in said second cell using frequency hopping within a set of hop frequencies including said first radio channel frequency; and when said first radio channel frequency is temporarily unused for receiving traffic in said second cell during said first time slot attempting instead to receive said control messages transmitted by a mobile station in said first cell during said first time slot on said first radio channel frequency.

86. The method of claim 85, further comprising the step of:

allocating said second time slot in said repetitive TDMA frame period for receiving speech or data traffic from a mobile station in said first cell using frequency hopping with a set of hop frequencies including said second radio channel frequency.

87. The method of claim 86, further comprising the step of:

whenever said second radio channel frequency is temporarily unused for receiving traffic in said first cell during said second time slot, attempting instead to receive during said second time slot using said second frequency one of said control messages transmitted from a mobile station in said second cell.

88. The method of claim 85, further comprising the steps of:

allocating a third time slot in said repetitive TDMA frame period for receiving said control messages from mobile stations in a third cell using a third radio channel frequency; and allocating said first time slot in said repetitive TDMA frame period for receiving speech or data traffic from a mobile of hop frequencies including said first and said second radio channel frequencies.

89. The method of claim 85, wherein said first time slot is not used for traffic transmission during pauses in speech activity in the direction of transmission mobile station to cellular system.

90. The method of claim 85, wherein said first time slot is not used for traffic transmission when no data packet is waiting for transmission in the direction of transmission mobile station to cellular system.

91. A method for receiving service request control messages or call acknowledgement control messages from mobile stations in a time division multiple access cellular communications system divided into a plurality of geographical cells, the method comprising the steps of:

allocating a first time slot in a repetitive TDMA frame period for receiving said control messages from mobile stations in a first cell using a first radio channel frequency;

allocating a second time slot in said repetitive TDMA frame period for receiving said control messages from mobile stations in a second cell using said first radio channel frequency;

allocating said first time slot in said repetitive TDMA frame period for receiving speech or data traffic from a mobile station in said second cell using frequency hopping within a set of bop frequencies including said first radio channel frequency; and when said first radio channel frequency is temporarily unused for traffic reception in said second cell during said first time slot, attempting to receive one of said control messages transmitted by a mobile station in said first cell during said first time slot using said first radio channel frequency.

92. The method of claim 91, further comprising the step of:

allocating said second time slot in said repetitive TDMA frame period or receiving said control messages from mobile stations in said first cell using frequency hopping within a set of hop frequencies including said first radio channel frequency.

93. The method of claim 92, further comprising the step of:

whenever said first radio channel frequency is temporarily unused for traffic reception in said first cell during said second time slot, attempting to receive one of said control messages transmitted from a mobile station in said second cell during said second time slot using said first radio channel frequency.

94. The method of claim 91, further comprising the steps of:

allocating a third time slot in said repetitive TDMA frame period for receiving said control messages from mobile stations in a third cell using said first radio channel frequency; and allocating said first time slot in said repetitive TDMA frame period for receiving speech or data traffic from a mobile station in said third cell using frequency hopping within a set of hop frequencies including said first radio channel frequency.

95. The method of claim 94, further comprising the step of:

allocating said second time slot in said repetitive TDMA frame period for receiving speech or data traffic from a mobile station in said third cell using frequency hopping within a set of hop frequencies including said first radio channel frequency.

96. The method of claim 91, wherein said first time slot is not used for traffic reception during pauses in speech activity in the direction of transmission mobile station to cellular system.

97. The method of claim 91, wherein said first time slot is not used for traffic reception when no data packet is waiting for transmission in the direction of transmission mobile station to cellular system.

98. A method for receiving service request control messages or call acknowledgement control messages from mobile stations in a time division multiple access cellular communications system divided into a plurality of geographical cells, the method comprising the steps of:

allocating a first time slot in a repetitive TDMA frame period for receiving said control messages from mobile stations in a first cell using a first radio channel frequency;

allocating said first time slot in said repetitive TDMA frame period for receiving said control messages from mobile stations in a second cell using a second radio channel frequency;

allocating said first time slot in said repetitive TDMA frame period for receiving speech or data traffic information from a mobile station in said second cell using frequency hopping within a set of hop frequencies including said first radio channel frequency; and when said first radio channel frequency is temporarily unused for traffic reception in said second cell, attempting to receive instead one of said control messages transmitted from a mobile station in said first cell during said first time slot using said first radio channel frequency.

99. The method of claim 98, further comprising the step of:

allocating said first time slot in said repetitive TDMA frame period for receiving speech or data traffic from a mobile station in said first cell using frequency hopping within a set of hop frequencies including said second radio channel frequency.

100. The method of claim 99, further comprising the step of:

whenever said second radio channel frequency is temporarily unused for traffic reception in said first cell, attempting instead to receive one of said control messages transmitted by a mobile station in said second cell during said first time slot using said second radio channel frequency.

101. The method of claim 98, further comprising the steps of:

allocating said first time slot in said repetitive TDMA frame period for receiving said control messages from mobile stations in a third cell using a third radio channel frequency; and allocating said second time slot in said repetitive TDMA frame period for receiving speech or data traffic from a mobile station in said third cell using frequency hopping within a set of hop frequencies including said first and said second radio channel frequencies.

102. The method of claim 101, further comprising the step of:

allocating said second time slot in said repetitive TDMA frame period for receiving speech or data traffic channel from a mobile station in said first cell using frequency hopping within a set of hop frequencies including said first and second third radio channel frequencies.

103. The method of claim 98, wherein said first time slot is not used for traffic reception during pauses in speech activity in the direction of transmission mobile station to cellular system.

104. The method of claim 98, wherein said first time slot is not used for traffic reception when no data packet is waiting for transmission in the direction of transmission mobile station to cellular system.

* * * * *